US012006560B2

(12) United States Patent
Yamamoto et al.

(10) Patent No.: US 12,006,560 B2
(45) Date of Patent: Jun. 11, 2024

(54) Fe-BASED NANOCRYSTALLINE ALLOY POWDER, MAGNETIC COMPONENT, AND DUST CORE

(71) Applicant: JFE STEEL CORPORATION, Tokyo (JP)

(72) Inventors: Naoki Yamamoto, Tokyo (JP); Takuya Takashita, Tokyo (JP); Makoto Nakaseko, Tokyo (JP); Akio Kobayashi, Tokyo (JP); Akiri Urata, Sendai (JP); Miho Chiba, Sendai (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/174,649

(22) Filed: Feb. 27, 2023

(65) Prior Publication Data

US 2023/0212719 A1 Jul. 6, 2023

Related U.S. Application Data

(62) Division of application No. 17/262,204, filed as application No. PCT/JP2019/029302 on Jul. 25, 2019, now Pat. No. 11,600,414.

(30) Foreign Application Priority Data

Jul. 31, 2018 (JP) ................................ 2018-144278

(51) Int. Cl.
*H01F 1/22* (2006.01)
*B22F 1/00* (2022.01)
(Continued)

(52) U.S. Cl.
CPC .............. *C22C 38/02* (2013.01); *B22F 1/052* (2022.01); *B22F 1/07* (2022.01); *B22F 1/08* (2022.01);
(Continued)

(58) Field of Classification Search
None
See application file for complete search history.

(56) References Cited

U.S. PATENT DOCUMENTS 8,491,731 B2 7/2013 Makino
9,793,035 B2 10/2017 Sakurai et al.
(Continued)

FOREIGN PATENT DOCUMENTS

CN 104532170 A 4/2015
CN 105097165 A 11/2015
(Continued)

OTHER PUBLICATIONS

Machine translation of JP 2012-136770A. (Year: 2012).*
(Continued)

*Primary Examiner* — Xiaowei Su
(74) *Attorney, Agent, or Firm* — KENJA IP LAW PC

(57) ABSTRACT

Provided is an Fe-based nanocrystalline alloy powder. The Fe-based nanocrystalline alloy powder has a chemical composition, excluding inevitable impurities, represented by a composition formula of $Fe_aSi_bB_cP_dCu_eM_f$, where the M in the composition formula is at least one element selected from the group consisting of Nb, Mo, Zr, Ta, W, Hf, Ti, V, Cr, Mn, C, Al, S, O, and N, 79 at %≤a≤84.5 at %, 0 at %≤b<6 at %, 0 at %<c≤10 at %, 4 at %<d≤11 at %, 0.2 at %≤e≤0.53 at %, 0 at %≤f≤4 at %, a+b+c+d+e+f=100 at %, a degree of crystallinity is more than 10% by volume, and an Fe crystallite diameter of the Fe-based nanocrystalline alloy powder is 50 nm or less.

10 Claims, 1 Drawing Sheet

(51) Int. Cl.

| | |
|---|---|
| ***B22F 1/052*** | (2022.01) |
| ***B22F 1/07*** | (2022.01) |
| ***B22F 1/08*** | (2022.01) |
| ***B22F 9/00*** | (2006.01) |
| ***C22C 38/02*** | (2006.01) |
| ***C22C 45/02*** | (2006.01) |
| ***H01F 1/153*** | (2006.01) |
| ***H01F 3/08*** | (2006.01) |
| ***H01F 27/255*** | (2006.01) |

(52) U.S. Cl.
CPC .............. *B22F 9/002* (2013.01); *C22C 45/02* (2013.01); *H01F 1/15308* (2013.01); *H01F 1/15333* (2013.01); *H01F 1/22* (2013.01); *H01F 3/08* (2013.01); *H01F 27/255* (2013.01); *B22F 2998/10* (2013.01); *C22C 2200/02* (2013.01); *C22C 2202/02* (2013.01)

(56) References Cited

U.S. PATENT DOCUMENTS

| | | | | |
|---|---|---|---|---|
| 2018/0169759 | A1 | 6/2018 | Nakamura et al. | |
| 2018/0233258 | A1 | 8/2018 | Chinnasamy et al. | |
| 2018/0361474 | A9 | 12/2018 | Nakamura et al. | |
| 2019/0013124 | A1 | 1/2019 | Maede et al. | |
| 2019/0156975 | A1 | 5/2019 | Urata et al. | |
| 2019/0362871 | A1 | 11/2019 | Urata et al. | |
| 2020/0238374 | A1 * | 7/2020 | Chiba | H01F 17/04 |

FOREIGN PATENT DOCUMENTS

| | | | |
|---|---|---|---|
| CN | 107851507 | A | 3/2018 |
| CN | 108172359 | A | 6/2018 |
| EP | 0302355 | A1 | 2/1989 |
| EP | 3330985 | A1 | 6/2018 |
| EP | 3549696 | A1 | 10/2019 |
| JP | 2010070852 | A | 4/2010 |
| JP | 2012136770 | A * | 7/2012 |
| JP | 2014138134 | A | 7/2014 |
| JP | 2017034069 | A | 2/2017 |
| JP | 2017034091 | A | 2/2017 |
| JP | 2018016829 | A | 2/2018 |
| JP | 6309149 | B1 | 4/2018 |
| JP | 2018131683 | A | 8/2018 |
| JP | 2019014960 | A | 1/2019 |
| WO | 2017022227 | A1 | 2/2017 |
| WO | 2018139563 | A1 | 8/2018 |
| WO | 2019065500 | A1 | 4/2019 |

OTHER PUBLICATIONS

Dec. 16, 2022, Office Action issued by the Canadian Intellectual Property Office in the corresponding Canadian Patent Application No. 3,151,502.

Dec. 22, 2020, Notification of Reasons for Refusal issued by the Japan Patent Office in the corresponding Japanese Patent Application No. 2019-568414 with English language Concise Statement of Relevance.

Jan. 4, 2022, Office Action issued by the Korean Intellectual Property Office in the corresponding Korean Patent Application No. 10-2021-7002158 with English language concise statement of relevance.

Machine translation of JP 2018-016829A. (Year: 2018).

Mar. 31, 2021, the Partial Supplementary European Search Report issued by the European Patent Office in the corresponding European Patent Application No. 19844369.9.

May 6, 2021, the Extended European Search Report issued by the European Patent Office in the corresponding European Patent Application No. 19844369.9.

Oct. 29, 2019, International Search Report issued in the International Patent Application No. PCT/JP2019/029302.

Sep. 3, 2021, Office Action issued by the China National Intellectual Property Administration in the corresponding Chinese Patent Application No. 201980050516.8 with English language search report.

* cited by examiner

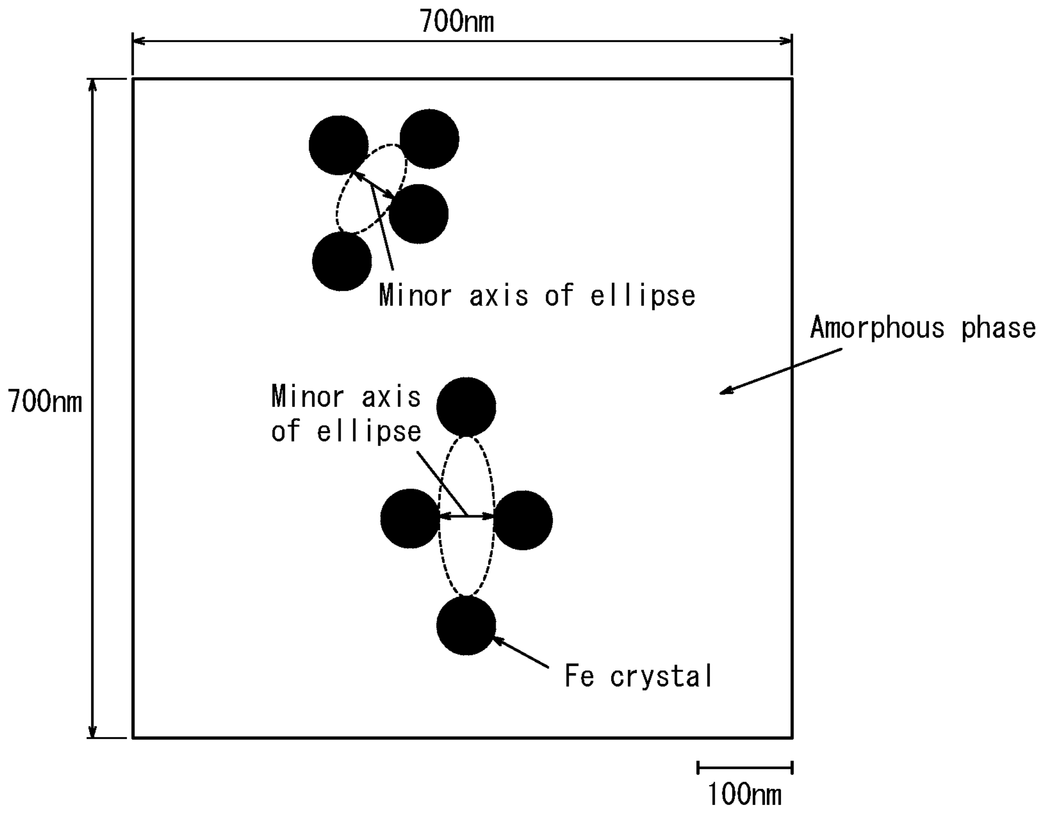
700nm
700nm
Minor axis of ellipse
Amorphous phase
Minor axis
of ellipse
Fe crystal
100nm

Fe-BASED NANOCRYSTALLINE ALLOY POWDER, MAGNETIC COMPONENT, AND DUST CORE

CROSS-REFERENCE TO RELATED APPLICATIONS

The present application is a divisional application of U.S. patent application Ser. No. 17/262,204 filed Jan. 22, 2021, which is a National Stage Application of PCT/JP2019/029302 filed Jul. 25, 2019, which claims priority of Japanese Patent Application No. 2018-144278 filed Jul. 31, 2018. The disclosures of the prior applications are hereby incorporated by reference herein in their entirety.

TECHNICAL FIELD

This disclosure relates to a soft magnetic powder, particularly to a soft magnetic powder that can be suitably used as a starting material during the production of magnetic components such as a transformer, an inductor, and a magnetic core of a motor. This disclosure also relates to an Fe-based nanocrystalline alloy powder, a magnetic component, and a dust core.

BACKGROUND

A dust core produced by subjecting an insulating-coated soft magnetic powder to pressing has many advantages such as a flexible shape and excellent magnetic properties in high-frequency ranges as compared with a core material produced by laminating electrical steel sheets. Therefore, the dust core is used in various applications such as transformers, inductors, and motor cores.

To improve the performance of the dust core, it is required to further improve the magnetic properties of magnetic powders used for producing the dust core.

For example, in the technical field of electric vehicles, dust cores having better magnetic properties (low core loss and high saturation magnetic flux density) are required to improve the cruising distance per charge.

To meet such requirements, various techniques of soft magnetic powders used for producing dust cores have been proposed.

For example, JP 2010-070852 A (PTL 1) proposes an alloy composition represented by a composition formula of $Fe_aB_bSi_cP_xC_yCu_z$. The alloy composition has a continuous strip shape or a powder shape, and the alloy composition having a powder shape (soft magnetic powder) can be produced with, for example, an atomizing method, and has an amorphous phase as the main phase. By subjecting the soft magnetic powder to heat treatment under predetermined conditions, nanocrystals of Fe having a body centered cubic structure (bcc Fe) are precipitated, and as a result, an Fe-based nanocrystalline alloy powder is obtained.

In addition, JP 2014-138134 A (PTL 2) proposes producing a dust core using a composite magnetic powder containing a first soft magnetic powder having a rounded end surface and a second soft magnetic powder having an average particle size smaller than that of the first soft magnetic powder. Further, PTL 2 proposes controlling the average particle size and the circularity of the first soft magnetic powder and the second soft magnetic powder within specific ranges. By using a powder having a rounded shape, it is possible to prevent particle edges from breaking the coating of insulating resins and prevent the insulating performance from deteriorating. In addition, since the end portions have a rounded shape, the voids between the particles are widened, and particles having a small particle size can enter the voids to increase the density of the dust core.

CITATION LIST

Patent Literature

PTL 1: JP 2010-070852 A
PTL 2: JP 2014-138134 A

SUMMARY

Technical Problem

According to the technique proposed in PTL 1, it is possible to obtain an Fe-based nanocrystalline alloy powder having high saturation magnetic flux density and high magnetic permeability using an alloy composition having a specific chemical composition. In addition, according to PTL 1, it is possible to produce a dust core having excellent magnetic properties using the Fe-based nanocrystalline alloy powder.

However, the magnetic properties are still insufficient, and it is required to further reduce the core loss and improve the magnetic flux density.

With respect to the technique of mixing a plurality of types of soft magnetic powders and using the mixed powder as proposed in PTL 2, it is necessary to produce a plurality of powders having different particle sizes and shapes and mix them at a controlled proportion. Therefore, the productivity is low, and the producing costs are high.

Further, particles having similar particle sizes may segregate in a mixed powder obtained by mixing powders having different particle sizes. In the case of using a mixed powder with segregation, small particles do not sufficiently enter the voids between large particles. As a result, the density of a dust core produced with the mixed powder is lower than that of a dust core produced with a soft magnetic powder having a uniform particle size, and the magnetic properties are deteriorated rather than improved.

It could thus be helpful to provide a soft magnetic powder and an Fe-based nanocrystalline alloy powder that can produce a dust core having excellent magnetic properties (low core loss and high saturation magnetic flux density). In addition, it could be helpful to provide a magnetic component, particularly a dust core, having excellent magnetic properties (low core loss and high saturation magnetic flux density).

Solution to Problem

To solve the above problems, we made intensive studies and discovered the following (1) to (3).

(1) The control of composition as in PTL 1 is not enough for further improving the magnetic properties. It is also necessary to take the influence of particle shape and particle size distribution on the density of a green compact into consideration.

(2) In addition, the particle size distribution and the circularity of the whole soft magnetic powder have a great influence on the strength and the magnetic properties of a dust core after compacting. Therefore, to further improve the magnetic properties, it is necessary to control an index indicating the properties of the whole soft magnetic powder rather than controlling the particle size or the circularity of individual powders contained in a mixed powder as in PTL 2.

(3) By controlling the median of the circularity of particles constituting a soft magnetic powder, which is an index indicating the properties of the whole soft magnetic powder, within a specific range, it is possible to effectively improve the magnetic properties of a dust core.

The present disclosure is based on the above discoveries. We thus provide the following.

1. A soft magnetic powder comprising a chemical composition, excluding inevitable impurities, represented by a composition formula of $Fe_aSi_bB_cP_dCu_eM_f$, wherein
 - the M in the composition formula is at least one element selected from the group consisting of Nb, Mo, Zr, Ta, W, Hf, Ti, V, Cr, Mn, C, Al, S, O, and N,
 - 79 at %≤a≤84.5 at %,
 - 0 at %≤b<6 at %,
 - 0 at %<c≤10 at %,
 - 4 at %<d≤11 at %,
 - 0.2 at %≤e≤0.53 at %,
 - 0 at %≤f≤4 at %,
 - a+b+c+d+e+f=100 at %,
 - a particle size is 1 mm or less, and
 - a median of circularity of particles constituting the soft magnetic powder is 0.4 or more and 1.0 or less.

2. The soft magnetic powder according to 1., wherein e<0.4 at %.

3. The soft magnetic powder according to 1. or 2., wherein an equivalent number n in the Rosin-Rammler equation is 0.3 or more and 30 or less.

4. The soft magnetic powder according to any one of 1. to 3., wherein
 b≥2 at %.

5. The soft magnetic powder according to any one of 1. to 4., wherein
 e≥0.3 at %.

6. The soft magnetic powder according to 5., wherein
 e≥0.35 at %.

7. The soft magnetic powder according to any one of 1. to 6., wherein
 a degree of crystallinity is 10% or less by volume, and the balance is an amorphous phase.

8. The soft magnetic powder according to 7., wherein
 the degree of crystallinity is 3% or less by volume.

9. An Fe-based nanocrystalline alloy powder comprising the chemical composition according to any one of 1., 2., 4., 5., and 6., wherein
 a degree of crystallinity is more than 10% by volume, and an Fe crystallite diameter is 50 nm or less 10. The Fe-based nanocrystalline alloy powder according to 9., wherein
 - the degree of crystallinity is more than 30% by volume, and
 - a maximum value of minor axis of an ellipse included in an amorphous phase in an area of 700 nm×700 nm in a cross section is 60 nm or less.

11. A magnetic component comprising the Fe-based nanocrystalline alloy powder according to 9. or 10.

12. A dust core comprising the Fe-based nanocrystalline alloy powder according to 9. or 10.

Advantageous Effect

Using the soft magnetic powder of the present disclosure as a starting material, it is possible to produce an Fe-based nanocrystalline alloy powder having good magnetic properties. In addition, using the Fe-based nanocrystalline alloy powder as a raw material, it is possible to produce a dust core having excellent magnetic properties (low core loss and high saturation magnetic flux density).

BRIEF DESCRIPTION OF THE DRAWINGS

In the Accompanying Drawing:

FIG. 1 schematically illustrates ellipses included in an amorphous phase in an area of 700 nm×700 nm measured with a transmission electron microscope (TEM).

DETAILED DESCRIPTION

The following describes an embodiment of the present disclosure. The following description merely represents a preferred embodiment of the present disclosure, and the present disclosure is not limited to the following description.

[Soft Magnetic Powder]

The soft magnetic powder of an embodiment of the present disclosure has a chemical composition, excluding inevitable impurities, represented by a composition formula of $Fe_aSi_bB_cP_dCu_eM_f$, where the M in the composition formula is at least one element selected from the group consisting of Nb, Mo, Zr, Ta, W, Hf, Ti, V, Cr, Mn, C, Al, S, O, and N, and the a to f in the composition formula satisfy the following conditions:

79 at %≤a≤84.5 at %
0 at %≤b<6 at %
0 at %<c≤10 at %
4 at %<d≤11 at %
0.2 at %≤e≤0.53 at %
0 at %≤f≤4 at %
a+b+c+d+e+f=100 at %

The soft magnetic powder can be used as a starting material for producing an Fe-based nanocrystalline alloy powder. The Fe-based nanocrystalline alloy powder produced with the soft magnetic powder of the present embodiment can be used as a material for producing various magnetic components and dust cores. In addition, the soft magnetic powder of the present embodiment can be used as a material for directly producing various magnetic components and dust cores.

(Chemical Composition)

The following describes the reasons for limiting the chemical composition of the soft magnetic powder to the above ranges.

Fe (79 at %≤a≤84.5 at %)

In the soft magnetic powder, Fe is a main element and is an essential element responsible for magnetism. To improve the saturation magnetic flux density (Bs) of the Fe-based nanocrystalline alloy powder produced with the soft magnetic powder and to reduce raw material costs, it is basically preferable to contain a large proportion of Fe in the soft magnetic powder. Therefore, the proportion of Fe represented by “a” in the composition formula is set to 79 at % or more to obtain an excellent saturation magnetic flux density Bs. In addition, when the proportion of Fe is 79 at % or more, the ΔT, which will be described later, can be increased. The proportion of Fe is preferably 80 at % or more from the viewpoint of further improving the saturation magnetic flux density.

On the other hand, to obtain a soft magnetic powder having a degree of crystallinity of 10% or less, the proportion of Fe should be 84.5 at % or less. From the viewpoint of further reducing the core loss of the dust core by setting the degree of crystallinity to 3% or less, the proportion of Fe is preferably 83.5 at % or less.

Si (0 at %≤b<6 at %)

Si is an element responsible for forming an amorphous phase, and it contributes to the stabilization of nanocrystals in nanocrystallization. To reduce the degree of crystallinity of the soft magnetic powder and to reduce the core loss of the dust core, the proportion of Si represented by "b" in the composition formula should be less than 6 at %. On the other hand, it is acceptable when the proportion of Si is 0 at % or more. However, from the viewpoint of further improving the saturation magnetic flux density of the Fe-based nanocrystalline alloy powder, the proportion of Si is preferably 2 at % or more. In addition, from the viewpoint of increasing the $\Delta T$, it is more preferably 3 at % or more.

B (0 at %<c≤10 at %)

In the soft magnetic powder, B is an essential element responsible for forming an amorphous phase. The addition of B is essential to suppress the degree of crystallinity of the soft magnetic powder to 10% or less and to reduce the core loss of the dust core. Therefore, the proportion of B represented by "c" in the composition formula is more than 0 at %. The proportion of B is preferably 3 at % or more and more preferably 5 at % or more. On the other hand, when the proportion of B is more than 10 at %, Fe—B compounds are precipitated, and the core loss of the dust core increases. Therefore, the proportion of B should be 10 at % or less. From the viewpoint of further reducing the core loss of the dust core by suppressing the degree of crystallinity of the soft magnetic powder to 3% or less, the proportion of B is preferably 8.5 at % or less.

P (4 at %<d≤11 at %)

In the soft magnetic powder, P is an essential element responsible for forming an amorphous phase. When the proportion of P represented by "d" in the composition formula is higher than 4 at %, the viscosity of molten alloy used during the production of the soft magnetic powder is lowered. As a result, it is easier to produce a soft magnetic powder having a spherical shape, which is preferable from the viewpoint of improving the magnetic properties of the dust core. In addition, when the proportion of P is higher than 4 at %, the melting point is lowered, so that the glass forming ability can be improved. As a result, it is easier to produce the Fe-based nanocrystalline alloy powder. These effects contribute to the production of a soft magnetic powder having a degree of crystallinity of 10% or less. Therefore, the proportion of P is more than 4 at %. From the viewpoint of improving the corrosion resistance, the proportion of P is preferably 5.5 at % or more. Further, from the viewpoint of further refining the nanocrystals in the Fe-based nanocrystalline alloy powder to further reduce the core loss of the dust core, the proportion of P is more preferably 6 at % or more.

On the other hand, the proportion of P should be 11 at % or less to obtain an Fe-based nanocrystalline alloy powder having a desired saturation magnetic flux density. From the viewpoint of further improving the saturation magnetic flux density, the proportion of P is preferably 10 at % or less and more preferably 8 at % or less.

Cu (0.2 at %≤e≤0.53 at %)

In the soft magnetic powder, Cu is an essential element that contributes to nanocrystallization. By setting the proportion of Cu represented by "e" in the composition formula to 0.2 at % or more and 0.53 at % or less, the glass forming ability of the soft magnetic powder can be improved, and, at the same time, the nanocrystals in the Fe-based nanocrystalline alloy powder can be uniformly refined even if the heating rate in a heat treatment is low. When the heating rate is low, the soft magnetic powder will not have uneven temperature distribution and the temperature is uniform throughout the powder. As a result, uniform Fe-based nanocrystals can be obtained. Therefore, excellent magnetic properties can be obtained even in the case of producing large magnetic components.

From the viewpoint of preventing coarsening of the nanocrystals in the Fe-based nanocrystalline alloy powder and obtaining desired core loss in the dust core, the proportion of Cu should be 0.2 at % or more. On the other hand, when the proportion of Cu is more than 0.53 at %, the nucleation of Fe is likely to occur, resulting in a degree of crystallinity of higher than 10%. Therefore, the proportion of Cu should be 0.53 at % or less from the viewpoint of suppressing the degree of crystallinity to 10% or less.

From the viewpoint of further refining the nanocrystals in the Fe-based nanocrystalline alloy powder to further reduce the core loss of the dust core, the proportion of Cu is preferably less than 0.4 at %. From the same viewpoint, the proportion of Cu is preferably 0.3 at % or more. In addition, from the viewpoint of further increasing the amount of nanocrystal precipitates and further improving the saturation magnetic flux density of the Fe-based nanocrystalline alloy powder, the proportion of Cu is more preferably 0.35 at % or more.

M (0 at %≤f≤4 at %)

The soft magnetic powder further contains 0 at % to 4 at % of M, where the M represents at least one element selected from the group consisting of Nb, Mo, Zr, Ta, W, Hf, Ti, V, Cr, Mn, C, Al, S, O, and N. By setting the total proportion of M represented by "f" in the composition formula to 4 at % or less, the glass forming ability and the corrosion resistance of the Fe-based nanocrystalline alloy powder are improved, and further, the precipitation of nanocrystals having a particle size of less than 50 nm can be suppressed. Further, when the proportion of M is 4 at % or less, it is possible to prevent the saturation magnetic flux density from decreasing due to excessive addition of M.

(Circularity)

In the soft magnetic powder of the present embodiment, the median of the circularity of the particles constituting the soft magnetic powder is 0.4 or more and 1.0 or less. A dust core is usually produced by subjecting an insulating-coated soft magnetic powder to pressing. At that time, if the shape of the particles is excessively distorted, the insulating coating on the surface of the particles is broken. As a result, the magnetic properties of the dust core are deteriorated. Further, if the shape of the particles is excessively distorted, the density of the dust core is decreased. As a result, the magnetic properties are deteriorated. Therefore, the median of the circularity is 0.4 or more. On the other hand, the upper limit of circularity is 1 according to its definition. Therefore, in the present embodiment, the median of the circularity is 1.0 or less. Since the average value of the circularity is greatly affected by the value of the particles having a large circularity, it is not suitable as an index indicating the circularity of the whole powder. Therefore, the present disclosure uses the median of the circularity.

Here, the circularity of the particles constituting the soft magnetic powder and its median can be measured with the following method. First, the soft magnetic powder is observed with a microscope, and the projected area A ($m^2$) and the perimeter P (m) of each particle included in the observation field are obtained. The circularity ($\varphi$) of one particle can be calculated from the projected area A and the perimeter P of the particle using the following equation (1). As used herein, the circularity φ is a dimensionless number.

$$\varphi=4\pi A/P^2 \quad (1)$$

When the obtained circularity φ of each particle is arranged in ascending order, the median value is defined as the median of the circularity (φ50). More specifically, the median of the circularity can be obtained with the method described in the section of EXAMPLES.

(Particle Size)

The particle size of the particles constituting the soft magnetic powder is 1 mm or less to reduce the degree of crystallinity. The particle size is preferably 200 μm or less. Note that the particle size of 1 mm or less here means that all particles contained in the soft magnetic powder have a particle size of 1 mm or less, that is, the soft magnetic powder does not contain any particle having a particle size of more than 1 mm. The particle size can be measured by a laser particle size distribution meter.

(Equivalent Number n)

By narrowing the particle size distribution of the soft magnetic powder, it is possible to suppress particle size segregation and further improve the density of the dust core. As a result, the magnetic properties of the dust core are further improved. Therefore, it is preferable to set the equivalent number n in the Rosin-Rammler equation to 0.3 or more. The equivalent number n is an index indicating the breadth of the particle size distribution. The larger the equivalent number n is, the narrower the particle size distribution is, that is, the more uniform the particle sizes are. On the other hand, when n is more than 30, the particle sizes are excessively uniform. As a result, the number of fine particles entering the gaps between coarse particles is insufficient, the void ratio increases, and the density of the dust core decreases. Therefore, from the viewpoint of further improving the magnetic properties, the equivalent number n in the Rosin-Rammler equation is preferably 30 or less.

The equivalent number n can be obtained with the following method. The Rosin-Rammler equation is one of the equations indicating the particle size distribution of powder and is represented by the following equation (2).

$$R=100\exp\{-(d/c)^n\} \quad (2)$$

The signs in the equation (2) each have the following meanings.

d(m): particle size

R (%): volume ratio of particles having a particle size of d or more c(m): a particle size when R=36.8% n(−): equivalent number

When the equation (2) is modified with a natural logarithm, the following equation (3) is obtained. Therefore, the slope of a straight line obtained by plotting the value of 1n d on the X-axis and the value of 1n{1n(100/R)} on the Y-axis is the equivalent number n.

$$1n\{1n(100/R)\}=n\times 1n\ d-n\times 1n\ c \quad (3)$$

Therefore, the equivalent number n can be obtained by linearly approximating the actual particle size distribution of the soft magnetic powder, which is measured with a laser particle size distribution meter, using the equation (3).

It is assumed that the Rosin-Rammler equation holds in the produced powder particles and the slope is applied as an equivalent number only when a correlation coefficient r of the linear approximation is 0.7 or more, which is generally considered to have a strong correlation. To ensure the accuracy of the equivalent number, the powder particles are divided into 10 or more particle size ranges based on the upper and lower limits of the particle size measured in the powder, and the volume ratio of particles in each particle size range is measured with a laser particle size distribution meter and applied to the Rosin-Rammler equation.

A soft magnetic powder having an equivalent number n of 0.3 or more and 30 or less can be produced, for example, with a water atomizing method by controlling the water pressure of water to be collided with molten steel, the flow ratio of water/molten steel, and the injection rate of molten steel.

(Degree of Crystallinity)

The degree of crystallinity of the soft magnetic powder is preferably 10% or less by volume. The reason will be described below.

Generally, in the case of producing a soft magnetic powder having an amorphous phase as a main phase, microcrystals (initial precipitates) of compound phases formed by αFe(—Si), Fe—B, or Fe—P may precipitate due to insufficient quenching during the cooling of molten metal, insufficient glass forming ability determined by the chemical composition of the powder, the effect of impurities contained in the used raw materials, or the like.

The initial precipitates deteriorate the magnetic properties of the Fe-based nanocrystalline alloy powder. Specifically, nanocrystals having a particle size of more than 50 nm may precipitate in the Fe-based nanocrystalline alloy powder due to the initial precipitates. The nanocrystals having a particle size of more than 50 nm inhibit the displacement of domain wall even if they are precipitated in a small amount and deteriorate the magnetic properties of the Fe-based nanocrystalline alloy powder.

In addition, since the precipitated compound phase is inferior in soft magnetic properties, its presence itself also significantly deteriorates the magnetic properties of the powder.

Therefore, it is generally considered that an initial degree of crystallinity (hereinafter simply referred to as "degree of crystallinity"), which is a volume ratio of the initial precipitates to the soft magnetic powder, should be as low as possible, and it is desirable to produce a soft magnetic powder consisting essentially only of an amorphous phase.

However, to obtain a soft magnetic powder having an extremely low degree of crystallinity, a complicated process such as excluding large-particle size powder by classification after atomization is required in addition to expensive raw materials. As a result, the producing costs of the soft magnetic powder increase.

Here, the soft magnetic powder of the present disclosure has a chemical composition represented by the above composition formula, and the chemical composition is not suitable for forming a continuous strip because required uniformity cannot be obtained due to the inclusion of crystals (initial precipitates). That is, when a continuous strip of the chemical composition is produced, it may contain 10% or less by volume of the initial precipitates. In this case, the continuous strip may be partially weakened due to the initial precipitates. Further, a uniform microstructure cannot be obtained even after nanocrystallization, and the magnetic properties may be significantly deteriorated due to the inclusion of a small amount of initial precipitates in the strip.

On the other hand, the above problem is inherent in a continuous strip. A soft magnetic powder hardly causes any problem in use even if the degree of crystallinity is about 10%. One reason is that, in the form of powder or dust core, it is rare to use the soft magnetic powder by exciting it to near saturation. In addition, since the powders are independent one by one, powders with poor properties cannot be excited and hardly affect the whole. It is possible to obtain an Fe-based nanocrystalline alloy powder having sufficient magnetic properties that is not inferior to an Fe-based nanocrystalline alloy powder obtained with a soft magnetic powder whose degree of crystallinity is very close to zero.

The soft magnetic powder of the present disclosure has the above-mentioned predetermined chemical composition, so that the degree of crystallinity can be suppressed to 10% or less. By suppressing the degree of crystallinity to 10% or less, it is possible to obtain an Fe-based nanocrystalline alloy powder having sufficient magnetic properties by the same heat treatment as in the past. That is, it is possible to produce an Fe-based nanocrystalline alloy powder having sufficient magnetic properties without increasing the producing costs by allowing some degree of crystallinity to an extent of 10% or less rather than making the degree of crystallinity extremely close to zero. More specifically, the soft magnetic powder of the present disclosure can be stably produced with relatively inexpensive raw materials using a common atomizing device. In addition, the production conditions such as the melting temperature of the raw materials can be eased.

The degree of crystallinity is preferably low. For example, the soft magnetic powder preferably has a degree of crystallinity of 3% or less by volume. To obtain a degree of crystallinity of 3% or less, it is preferable that a≤83.5 at %, c≤8.5 at %, and d≥5.5 at %.

When the degree of crystallinity is 3% or less, the compacting density during the production of dust core is further improved. By setting the degree of crystallinity to 3%, the increase in hardness of the material due to crystallization can be further suppressed. As a result, the compacting density can be further improved, and the magnetic permeability can be further increased. In addition, when the degree of crystallinity is 3% or less, the appearance of the soft magnetic powder can be easily maintained. Specifically, when the degree of crystallinity is high, the grain boundaries of recrystallized parts are fragile. As a result, the soft magnetic powder after atomization may be discolored due to oxidation. Therefore, by setting the degree of crystallinity to 3% or less, discoloration of the soft magnetic powder can be suppressed, and the appearance can be maintained.

The degree of crystallinity and the grain size of the initial precipitates can be calculated by analyzing the measurement results of X-ray diffraction (XRD) with the WPPD method (whole-powder-pattern decomposition method). Precipitation phases such as αFe(—Si) phase and compound phase can be identified from the peak position of the results of X-ray diffraction.

The above-mentioned degree of crystallinity is a volume ratio of the whole initial precipitates to the whole soft magnetic powder and does not refer to the degree of crystallinity of individual particles constituting the powder. Therefore, even in the case where the degree of crystallinity of the soft magnetic powder is 10% or less, for example, amorphous single-phase particles may be included in the powder as long as the degree of crystallinity of the whole powder is 10% or less.

(Amorphous Phase)

As described above, the soft magnetic powder preferably has a degree of crystallinity of 10% or less by volume. At that time, the balance other than the precipitates is preferably an amorphous phase. It can be said that such a soft magnetic powder has an amorphous phase as a main phase. In other words, the soft magnetic powder of an embodiment of the present disclosure preferably contains 10% or less by volume of precipitates, with an amorphous phase being the balance. By subjecting the soft magnetic powder to heat treatment under predetermined heat treatment conditions, nanocrystals of bcc Fe (αFe(—Si)) are precipitated, and an Fe-based nanocrystalline alloy powder having excellent magnetic properties is obtained.

(Method of Producing Soft Magnetic Powder)

Next, a method of producing the soft magnetic powder of an embodiment of the present disclosure will be described. The following description merely represents an example of the production method, and the present disclosure is not limited to the following description.

There are no specific limitations on the production of the soft magnetic powder, and various production methods may be used. For example, the soft magnetic powder can be produced with an atomizing method. The atomizing method may be any one of a water atomizing method and a gas atomizing method. In other words, the soft magnetic powder may be an atomized powder, and the atomized powder may be at least one of water atomized powder and gas atomized powder.

The method of producing the soft magnetic powder with an atomizing method will be described below. First, raw materials are prepared. Next, the raw materials are weighed to obtain the predetermined chemical composition, and the raw materials are melted to prepare molten alloy. At this time, since the chemical composition of the soft magnetic powder of the present disclosure has a low melting point, power consumption for melting can be reduced. Next, the molten alloy is discharged out from a nozzle and, at the same time, divided into alloy droplets using high-pressure water or gas to obtain fine soft magnetic powder.

In the above powder production process, the gas used for the division may be an inert gas such as argon or nitrogen. Further, in order to improve the cooling rate, the alloy droplets immediately after the division may be brought into contact with a liquid or solid for cooling so that the alloy droplets are rapidly cooled, or the alloy droplets may be further divided to be finer. In the case of using a liquid for cooling, water or oil may be used as the liquid, for example. In the case of using a solid for cooling, a rotating copper roll or a rotating aluminum plate may be used as the solid, for example. Note that the liquid or solid for cooling is not limited to these, and any other material may be used.

In the above powder production process, the powder shape and the particle size of the soft magnetic powder can be adjusted by changing the production conditions. According to the present embodiment, the viscosity of the molten alloy is low, so that the soft magnetic powder can be easily formed into a spherical shape.

In the above production process, initial precipitates are precipitated in the soft magnetic powder whose main phase is an amorphous phase. When compounds such as Fe—B and Fe—P are precipitated as initial precipitates, the magnetic properties are significantly deteriorated. In the soft magnetic powder of the present disclosure, however, the precipitation of compounds such as Fe—B and Fe—P is suppressed, and the initial precipitates are basically bcc αFe(—Si).

[Fe-Based Nanocrystalline Alloy Powder]

The Fe-based nanocrystalline alloy powder of an embodiment of the present disclosure has the above chemical composition, where the degree of crystallinity is more than 10% by volume, and the Fe crystallite diameter is 50 nm or less.

(Degree of Crystallinity)

When the degree of crystallinity of the Fe-based nanocrystalline alloy powder is 10% or less, the core loss of the dust core increases. Therefore, the degree of crystallinity of the Fe-based nanocrystalline alloy powder is more than 10% by volume. By setting the degree of crystallinity to more than 10% by volume, the core loss of the dust core can be reduced. The degree of crystallinity is more preferably more than 30% by volume. By setting the degree of crystallinity to 30%, the core loss of the dust core can be further reduced.

The degree of crystallinity of the Fe-based nanocrystalline alloy powder can be measured with the same method as the degree of crystallinity of the soft magnetic powder described above.

(Fe Crystallite Diameter)

When the Fe crystallite diameter of the Fe-based nanocrystalline alloy powder is larger than 50 nm, the crystal magnetic anisotropy is large, and the soft magnetic properties deteriorate. Therefore, the Fe crystallite diameter of the Fe-based nanocrystalline alloy powder is 50 nm or less. By setting the Fe crystallite diameter of the Fe-based nanocrystalline alloy powder to 50 nm or less, the soft magnetic properties can be improved. The Fe crystallite diameter is preferably 40 nm or less. By setting the Fe crystallite diameter to 40 nm or less, the soft magnetic properties can be further improved. The Fe crystallite diameter can be measured by XRD.

(Minor Axis of Ellipse Included in Amorphous Phase)

The maximum value of the minor axis of an ellipse included in the amorphous phase in an area of 700 nm×700 nm in a cross section of the Fe-based nanocrystalline alloy powder is preferably 60 nm or less. The maximum value of the minor axis of the ellipse can be regarded as an index of the distance between crystals included in the Fe-based nanocrystalline alloy powder. By setting the maximum value of the minor axis of the ellipse to 60 nm or less, the core loss of the dust core obtained using the Fe-based nanocrystalline alloy powder can be further reduced.

The minor axis of the ellipse can be obtained by observing the Fe-based nanocrystalline alloy powder with a transmission electron microscope (TEM). In an observation image of TEM, an amorphous phase and a crystalline phase can be distinguished. As schematically illustrated in FIG. 1, the minor axis of an ellipse included in the amorphous phase (ellipse in contact with crystalline phases) can be obtained by image interpretation. Then, the maximum value of the minor axis in an area of 700 nm×700 nm is obtained. Although the value of the minor axis of the ellipse varies depending on how the ellipse is taken, the maximum value of the minor axis of the ellipse is a value not exceeding the maximum value of the distance between crystalline phases and is uniquely determined. Therefore, in the present disclosure, the maximum value of the minor axis of the ellipse is used as an index of the distance between crystals included in the Fe-based nanocrystalline alloy powder.

The observation with a TEM can be performed by the following procedure. First, an epoxy resin and the powder are mixed, and the mixture is filled in a metal pipe corresponding to the size of a TEM sample and polymerized and cured at a temperature of about 100° C. Next, the pipe is cut with a diamond cutter to obtain a disk having a thickness of about 1 mm, and one side of the disk is mirror polished. Subsequently, the side opposite to the mirror-polished side is polished with abrasive paper to a thickness of about 0.1 mm, and a dent is made with a dimpler so that the thickness in the central portion is about 40 μm. Next, the disk is polished with an ion milling device to open a small hole, and the thin portion near the small hole is observed with a TEM.

(Method of Producing Fe-Based Nanocrystalline Alloy Powder)

Next, a method of producing the Fe-based nanocrystalline alloy powder of an embodiment of the present disclosure will be described. The Fe-based nanocrystalline alloy powder can be produced with the soft magnetic powder described above. By subjecting the soft magnetic powder to heat treatment under predetermined conditions, nanocrystals of bcc Fe (αFe(—Si)) are precipitated, thereby obtaining an Fe-based nanocrystalline alloy powder having excellent magnetic properties. The Fe-based nanocrystalline alloy powder thus obtained is a powder composed of an Fe-based alloy containing an amorphous phase and nanocrystals of bcc Fe.

During the production of the Fe-based nanocrystalline alloy powder, it is preferable to heat the soft magnetic powder at a heating rate of 30° C./min or less to a maximum end-point temperature ($T_{max}$) that is first crystallization start temperature ($T_{x1}$)−50K or higher and lower than second crystallization start temperature ($T_{x2}$). The heating conditions will be described below.

When the soft magnetic powder is subjected to heat treatment in an inert atmosphere such as an Ar or $N_2$ gas atmosphere, crystallization can be confirmed twice or more. The temperature at which first crystallization starts is called a first crystallization start temperature ($T_{x1}$), and the temperature at which second crystallization starts is called a second crystallization start temperature ($T_{x2}$). Further, the temperature difference ($T_{x2}-T_{x1}$) between the first crystallization start temperature ($T_{x1}$) and the second crystallization start temperature ($T_{x2}$) is defined as ΔT.

The first crystallization start temperature ($T_{x1}$) is an exothermic peak of precipitation of nanocrystals of bcc Fe, and the second crystallization start temperature ($T_{x2}$) is an exothermic peak of precipitation of compounds such as FeB and FeP. These crystallization temperatures can be evaluated by, for example, using a differential scanning calorimetry (DSC) device and performing thermal analysis under heating rate conditions in actual crystallization.

When the ΔT is large, it is easy to perform the heat treatment under predetermined heat treatment conditions. Therefore, it is possible to precipitate only nanocrystals of bcc Fe in the heat treatment to obtain an Fe-based nanocrystalline alloy powder having better magnetic properties. That is, by increasing the ΔT, the nanocrystalline structure of bcc Fe in the Fe-based nanocrystalline alloy powder is more stable, and the core loss of the dust core containing the Fe-based nanocrystalline alloy powder can be further reduced.

By setting the maximum end-point temperature ($T_{max}$) in the heating process lower than the second crystallization start temperature ($T_{x2}$), the precipitation of compound phase in the heating process can be prevented. The heat treatment is preferably performed at a temperature of 550° C. or lower. On the other hand, it is preferable to set the $T_{max}$ to the first crystallization start temperature ($T_{x1}$)−50K or higher so that Fe is nanocrystallized from an amorphous state. The heat treatment is preferably performed at a temperature of 300° C. or higher.

The heating process is preferably performed in an inert atmosphere such as an argon or nitrogen atmosphere. However, the heating may be partially performed in an oxidizing atmosphere so that an oxide layer is formed on the surface of the Fe-based nanocrystalline alloy powder to improve the corrosion resistance and the insulating properties. Further, the heating may be partially performed in a reducing atmosphere to improve the surface condition of the Fe-based nanocrystalline alloy powder.

The heating rate in the heating is 30° C./min or less. By setting the heating rate to 30° C./min or less, the growth of Fe crystal grains is suppressed, the crystallization rate is increased, and the temperature difference ΔT between $T_{x1}$ and $T_{x2}$ is increased. As a result, it is possible to decrease the coercive force Hc and the core loss of a dust core and to prevent the formation of Fe—B alloy or Fe—P alloy that adversely affects the magnetic properties.

[Magnetic Component and Dust Core]

A magnetic component of an embodiment of the present disclosure is a magnetic component including the Fe-based nanocrystalline alloy powder. In addition, a dust core of another embodiment of the present disclosure is a dust core including the Fe-based nanocrystalline alloy powder. That is, a magnetic component such as a magnetic sheet, and a dust core can be produced by subjecting the Fe-based nanocrystalline alloy powder to compacting. In addition, magnetic components such as a transformer, an inductor, a motor, and a generator can be produced using the dust core.

The Fe-based nanocrystalline alloy powder of the present disclosure contains highly magnetized nanocrystals (αFe(—Si) of bcc Fe) in high volume ratio. In addition, the crystal magnetic anisotropy is low because of the refinement of αFe(—Si). Further, the magnetostriction is reduced because of a mixed phase of the positive magnetostriction of the amorphous phase and the negative magnetostriction of the αFe(—Si) phase. Therefore, using the Fe-based nanocrystalline alloy powder of the present embodiment, it is possible to produce a dust core having excellent magnetic properties with high saturation magnetic flux density Bs and low core loss.

In another embodiment of the present disclosure, a magnetic component such as a magnetic sheet, and a dust core can be produced using a soft magnetic powder that has not been heat-treated instead of the Fe-based nanocrystalline alloy powder. For example, a magnetic component or a dust core can be produced by subjecting the soft magnetic powder to compacting to obtain a predetermined shape and then subjecting it to heat treatment under predetermined heat treatment conditions. In addition, magnetic components such as a transformer, an inductor, a motor, and a generator can be produced using the dust core. The following describes an example of a method of producing a magnetic core of a dust core using the soft magnetic powder.

In the magnetic core production process, the soft magnetic powder is first mixed with a binder having good insulating properties such as a resin and granulated to obtain granulated powder. In the case of using a resin as the binder, silicone, epoxy, phenol, melamine, polyurethane, polyimide, and polyamideimide may be used, for example. To improve the insulating properties and the binding properties, materials such as phosphates, borates, chromates, oxides (silica, alumina, magnesia, etc.), and inorganic polymers (polysilane, polygermane, polystannane, polysiloxane, polysilsesquioxane, polysilazane, polyborazylene, polyphosphazene, etc.) may be used as a binder instead of the resin or together with the resin. More than one binder may be used in combination, and different binders may form a coating having a two or more-layer structure. The amount of the binder is generally preferably about 0.1 mass % to 10 mass %, and is preferably about 0.3 mass % to 6 mass % in consideration of the insulating properties and the filling factor. The amount of the binder may be appropriately determined in consideration of the particle size of the powder, the applied frequency, the use, and the like.

In the magnetic core production process, the granulated powder is then subjected to pressing using a mold to obtain a green compact. Next, the green compact is subjected to heat treatment under predetermined heat treatment conditions to simultaneously perform nanocrystallization and hardening of the binder to obtain a dust core. The pressing may be generally performed at room temperature. It is also possible to use a highly heat-resistant resin or coating during the production of granulated powder with the soft magnetic powder of the present embodiment and perform pressing in a temperature range of, for example, 550° C. or lower to obtain a dust core having an extremely high density.

In the magnetic core production process, a powder (soft powder) such as Fe, FeSi, FeSiCr, FeSiAl, FeNi, and carbonyl iron dust that is softer than the soft magnetic powder may be mixed with the granulated powder during the pressing of the granulated powder to improve the filling properties and to suppress heat generation in nanocrystallization. Further, any soft magnetic powder having a particle size different from that of the above-mentioned soft magnetic powder may be mixed instead of the above-mentioned soft powder or together with the soft powder. At that time, the mixing amount of the soft magnetic powder having a different particle size is preferably 50 mass % or less with respect to the soft magnetic powder of the present disclosure.

The dust core may be produced with a production method different from the above-mentioned method. For example, as described above, the dust core may be produced using the Fe-based nanocrystalline alloy powder of the present embodiment. In this case, a granulated powder may be produced in the same manner as in the above-mentioned magnetic core production process. A dust core may be produced by subjecting the granulated powder to pressing using a mold.

The dust core of the present embodiment thus produced includes the Fe-based nanocrystalline alloy powder of the present embodiment regardless of the production process. The same applies to the magnetic component of the present embodiment, where the magnetic component includes the Fe-based nanocrystalline alloy powder of the present embodiment.

EXAMPLES

Next, the present disclosure will be described in more detail based on examples. However, the present disclosure is not restricted to the following examples, and the present disclosure may be changed appropriately within the range conforming to the purpose of the present disclosure, all of such changes being included within the technical scope of the present disclosure.

First Example

The following experiments were conducted to evaluate the influence of chemical composition on magnetic properties.

Production and Evaluation of Soft Magnetic Powder

First, industrial pure iron, ferrosilicon, ferrophosphorus, ferroboron, ferroniobium, ferromolybdenum, zirconium, tantalum, tungsten, hafnium, titanium, ferrovanadium, ferrochrome, ferromanganese, ferrocarbon, ferroaluminium, iron sulfide, and electrolytic copper were prepared as raw materials for producing soft magnetic powders. The raw materials were weighed to obtain the chemical composition listed in Table 1 and melted by high-frequency melting in an argon atmosphere to obtain molten alloy. The molten alloy was treated with a water atomizing method to obtain a soft magnetic powder (alloy powder).

Next, the median of the circularity of the obtained soft magnetic powder, the degree of crystallinity of the soft magnetic powder, and the precipitation phase (precipitate) were evaluated.

The median of the circularity was evaluated by the following procedure. First, the soft magnetic powder was dried and then charged into a particle image analyzer Morphologi G3 (manufactured by Spectris Co., Ltd.). The Morphologi G3 is a device having the function of capturing an image of particles with a microscope and analyzing the obtained image. The soft magnetic powder was dispersed on glass by air of 500 kPa so that the shape of individual particles could be identified. Next, the soft magnetic powder dispersed on glass was observed with a microscope attached to Morphologi G3, and the magnification was automatically adjusted so that the number of particles included in the observation field was 60,000. Subsequently, image interpretation was performed on the 60,000 particles included in the observation field, and the circularity φ of each particle was automatically calculated. The obtained circularity φ of the individual particles was arranged in ascending order, and the median value was defined as the median of the circularity (φ50). The median of the circularity of all the obtained soft magnetic powders was 0.7 or more and 1.0 or less.

In addition, the evaluation of the degree of crystallinity of the soft magnetic powder and the precipitation phase (precipitate) were performed with the method using XRD described above. The measured value of the degree of crystallinity and the identified precipitates are also listed in Table 1. Note that the abbreviations in the "precipitate" column of the tables including Table 1 have the following meanings, respectively.

αFe: crystalline phase of bcc Fe

Com: at least one of Fe—B compound and Fe—P compound amo: consisting of an amorphous phase and no precipitate Further, the particle size distribution of the obtained soft magnetic powder was measured with a laser particle size distribution meter. As a result, all the soft magnetic powders had a particle size of 1 mm or less. That is, none of the soft magnetic powders contained particles having a particle size of more than 1 mm.

Production and Evaluation of Fe-Based Nanocrystalline Alloy Powder

Next, Fe-based nanocrystalline alloy powders were produced using the obtained soft magnetic powders as a starting material. The Fe-based nanocrystalline alloy powder was produced by subjecting the soft magnetic powder to heat treatment in an argon atmosphere using an electric heating furnace. In the heat treatment, the soft magnetic powder was heated up to the maximum end-point temperature (Tmax) listed in Table 2 at a heating rate of 10° C./min and held at the maximum end-point temperature for 10 minutes.

The saturation magnetic moment of the obtained Fe-based nanocrystalline alloy powder was measured using a vibrating sample magnetometer (VSM), and the saturation magnetic flux density was calculated from the measured saturation magnetic moment and the density. The value of the obtained saturation magnetic flux density Bs(T) is also listed in Table 2.

Production and Evaluation of Dust Core

Further, dust cores were produced by the following procedure using the soft magnetic powders (that had not been heat-treated). First, the soft magnetic powder was granulated using a 2 mass % silicone resin. Next, the granulated powder was compacted under a compacting pressure of 10 ton/cm$^2$ using a mold having an outer diameter of 13 mm and an inner diameter of 8 mm. Subsequently, it was subjected to heat treatment using an electric heating furnace to obtain a dust core. The heat treatment was performed under the same conditions as the heat treatment in the production of the Fe-based nanocrystalline alloy powder.

Fe-based nanocrystalline alloy produced by the heat treatment was present in the obtained dust core. The Fe crystallite diameter of the Fe-based nanocrystalline alloy was measured by XRD. In addition, the core loss of the dust core at 20 kHz-100 mT was measured using an AC BH analyzer. The obtained Fe crystallite diameter and the core loss are also listed in Table 2. Note that a core loss value of 100 kW/m$^3$ or less was classified as "excellent", a core loss value of more than 100 kW/m$^3$ and 200 kW/m$^3$ or less was classified as "good", and a core loss value of more than 200 kW/m$^3$ was classified as "poor".

Second to Sixth Examples

To further evaluate the influence of chemical composition on magnetic properties, soft magnetic powders were produced under the same conditions as those of the first example except that the chemical compositions were as listed in Tables 3, 5, 7, 9, and 11, and the median of the circularity, the degree of crystallinity, the precipitate, and the particle size of the obtained soft magnetic powders were evaluated. The median of the circularity of all the obtained soft magnetic powders was 0.7 or more and 1.0 or less. In addition, the particle size of all the soft magnetic powders was 1 mm or less. The measured value of the degree of crystallinity and the identified precipitate are also listed in the tables.

Further, using the soft magnetic powders listed in Tables 3, 5, 7, 9, and 11, Fe-based nanocrystalline alloy powders and dust cores were produced and evaluated in the same manner as in the first example. The heat treatment conditions used, and the evaluation results are listed in Tables 4, 6, 8, 10, and 12.

The correspondence relations of the tables are as follows. Each example mainly evaluated the influence of the proportion of the component in parentheses.

First example: Tables 1 and 2 (Fe)

Second example: Tables 3 and 4 (Si)

Third example: Tables 5 and 6(B)

Fourth example: Tables 7 and 8 (P)

Fifth example: Tables 9 and 10 (Cu)

Sixth example: Tables 11 and 12 (M)

As can be seen from the results listed in Table 2, the core loss of the dust core is large in Comparative Example 3, in which the proportion of Fe is more than 84.5 at %, and in Comparative Example 4, in which the proportion of Fe is less than 79 at %. In addition, the saturation magnetic flux density is low in Comparative Example 4. On the other hand, the Fe-based nanocrystalline alloy powders of Examples 7 to 12 contain Fe in the range of 79 at % to 84.5 at %, and the core loss of the dust core is lower than that of Comparative Examples 3 and 4. In addition, the Fe-based nanocrystalline alloy powders of Examples 7 to 12 have a high saturation magnetic flux density of 1.65 T or more.

It can be seen from the above results that excellent properties can be obtained by setting the proportion of Fe to 79 at % or more and 84.5% or less. In addition, it can be seen from the results of Examples 8 to 12 that the proportion of Fe is preferably 83.5 at % or less because the core loss is further reduced in this case. Further, it can be seen from the results of Examples 7 to 11 that, when the proportion of Fe is 80 at % or more, it is possible to obtain a saturation magnetic flux density of 1.70 T or more.

As can be seen from the results listed in Table 4, the Fe-based nanocrystalline alloy powder of Comparative Example 6 contains more than 6 at % of Si, and the core loss of the dust core is large. On the other hand, the Fe-based nanocrystalline alloy powders of Examples 17 to 20 contain Si in the range of 0 at % or more and less than 6 at %, and the core loss of the dust core is lower than that of the dust core of Comparative Example 6. In addition, the Fe-based nanocrystalline alloy powders of Examples 17 to 20 have a high saturation magnetic flux density of 1.7 T or more.

It can be seen from the above results that excellent properties can be obtained by setting the proportion of Si to 0 at % or more and less than 6 at %. In addition, it can be seen from the results of Examples 17 and 18 that the proportion of Si is preferably 2 at % or more because the saturation magnetic flux density is further improved in this case.

As can be seen from the results listed in Table 6, the core loss of the dust core is large in Comparative Example 9 containing more than 10 at % of B and in Comparative Example 10 containing no B at all. On the other hand, the Fe-based nanocrystalline alloy powders of Examples 26 to 30 contain B in the range of 10 at % or less, and the core loss of the dust core is lower than that of Comparative Examples 9 and 10. In addition, the Fe-based nanocrystalline alloy powders of Examples 26 to 30 have a high saturation magnetic flux density of 1.7 T or more.

It can be seen from the above results that excellent properties can be obtained by setting the proportion of B to more than 0 at % and 10 at % or less. In addition, it can be seen from Examples 23, 24, and 25 in Table 5 that the degree of crystallinity can be suppressed to 3% or less and the core loss can be further reduced when the proportion of B is 8.5 at % or less.

As can be seen from the results listed in Table 8, the core loss of the dust core is large in Comparative Example 13, in which the proportion of P is more than 11 at %, and in Comparative Example 14, in which the proportion of P is less than 4 at %. On the other hand, the Fe-based nanocrystalline alloy powders of Examples 38 to 44 contain P in the range of more than 4 at % and 11 at % or less, and the core loss of the dust core is lower than that of Comparative Examples 13 and 14. In addition, the Fe-based nanocrystalline alloy powders of Examples 38 to 44 have a high saturation magnetic flux density of 1.7 T or more.

It can be seen from the above results that excellent properties can be obtained by setting the proportion of P to more than 4 at % and 11 at % or less. In addition, it can be seen from the results of Examples 38 to 43 that the core loss can be further reduced when the proportion is 6 at % or more. It can be seen from the results of Examples 40 to 44 that the saturation magnetic flux density is further improved when the proportion of P is 10 at % or less, and that the saturation magnetic flux density is still further improved when the proportion of P is 8 at % or less.

As can be seen from the results listed in Table 10, the core loss of the dust core is large in Comparative Example 17, in which the proportion of Cu is more than 0.53 at %, and in Comparative Example 18, in which the proportion of Cu is less than 0.2 at %. On the other hand, the Fe-based nanocrystalline alloy powders of Examples 52 to 58 contain 0.2 at % or more and 0.53 at % or less of Cu, and the core loss of the dust core is lower than that of Comparative Examples 17 and 18. In addition, the Fe-based nanocrystalline alloy powders of Examples 52 to 58 have a high saturation magnetic flux density of 1.65 T or more.

It can be seen from the above results that excellent properties can be obtained by setting the proportion of Cu to 0.2 at % or more and 0.53 at % or less. In addition, it can be seen from the results of Examples 54 to 57 that the core loss can be further reduced when the proportion of Cu is 0.3 at % or more and less than 0.4 at %. It can be seen from the results of Example 54 that the saturation magnetic flux density is further improved when the proportion of Cu is 0.3 at % or more. In addition, it is seen that the core loss can be further reduced when the proportion of Cu is 0.35 at % or more.

Taking the chemical composition containing Nb as an example, the Fe-based nanocrystalline alloy powder of Comparative Example 21 contains more than 4 at % of Nb, and the core loss of the dust core is large, as can be seen from the results listed in Table 12. On the other hand, the Fe-based nanocrystalline alloy powders of Examples 81 to 89 contain 4 at % or less of Nb, and the core loss of the dust core is lower than that of Comparative Example 21. In addition, the Fe-based nanocrystalline alloy powders of Examples 81 to 89 have a high saturation magnetic flux density of 1.65 T or more and even have a high saturation magnetic flux density of 1.70 T or more when the proportion is in the range of 2.5 at % or less. Further, it can be seen from comparison of Comparative Examples 21 and 22 and Examples 81 to 102 that, in the case of containing 4 at % or less of at least one element selected from the group consisting of Mo, Zr, Ta, W, Hf, Ti, V, Cr, Mn, C, Al, S, O, and N as the M, the core loss of dust core is reduced.

It can be seen from the above results that excellent properties can be obtained by setting the proportion of M, which is at least one element selected from the group consisting of Nb, Mo, Zr, Ta, W, Hf, Ti, V, Cr, Mn, C, Al, S, O, and N, contained in the soft magnetic powder to 4 at % or less.

Further, it can be understood from comparison of Examples 7 to 12, 17 to 20, 26 to 30, 38 to 44, 52 to 58, 81 to 102 and Comparative Examples 10, 14, and 18 of Tables 2, 4, 6, 8, 10, and 12 that the Fe crystallite diameter in the Fe-based nanocrystalline alloy powder is preferably 50 nm or less.

TABLE 1

| | Soft magnetic powder | | |
|---|---|---|---|
| | Chemical composition | Degree of crystallinity (%) | Precipitate |
| Comparative Example 1 | Fe85.12Si2B5P7.5Cu0.38 | 82 | αFe + Com |
| Example 1 | Fe84.42Si2B5.7P7.5Cu0.38 | 8 | αFe |
| Example 2 | Fe83.42Si2B6.7P7.5Cu0.38 | 2 | αFe |
| Example 3 | Fe83.42Si0B7.7P8.5Cu0.38 | 3 | αFe |
| Example 4 | Fe82.12Si3B6P8.5Cu0.38 | 1 | αFe |
| Example 5 | Fe80.12Si4B7.5P8.0Cu0.38 | 1 | αFe |
| Example 6 | Fe79.12Si5B5P10.5Cu0.38 | 0 | amo |
| Comparative Example 2 | Fe78.42Si5B6.2P10Cu0.38 | 0 | amo |

TABLE 2

| | Heat treatment condition | Fe-based nanocrystalline alloy powder | | Dust core | | |
|---|---|---|---|---|---|---|
| | Maximum end-point temperature Tmax (° C.) | Chemical composition | Saturation magnetic flux density Bs (T) | Fe crystallite diameter (nm) | Core loss (kW/m$^3$) | Core loss evaluation |
| Comparative Example 3 | 400 | Fe85.12Si2B5P7.5Cu0.38 | 1.82 | Compound phase | 4000 | Poor |
| Example 7 | 400 | Fe84.42Si2B5.7P7.5Cu0.38 | 1.78 | 42 | 200 | Good |
| Example 8 | 410 | Fe83.42Si2B6.7P7.5Cu0.38 | 1.76 | 35 | 90 | Excellent |
| Example 9 | 410 | Fe83.42Si0B7.7P8.5Cu0.38 | 1.74 | 38 | 180 | Good |
| Example 10 | 410 | Fe82.12Si3B6P8.5Cu0.38 | 1.73 | 32 | 75 | Excellent |
| Example 11 | 410 | Fe80.12Si4B7.5P8.0Cu0.38 | 1.70 | 36 | 170 | Good |
| Example 12 | 420 | Fe79.12Si5B5P10.5Cu0.38 | 1.65 | 32 | 100 | Excellent |
| Comparative Example 4 | 420 | Fe78.42Si5B6.2P10Cu0.38 | 1.55 | 35 | 200 | Good |

TABLE 3

| | Soft magnetic powder | | |
|---|---|---|---|
| | Chemical composition | Degree of crystallinity (%) | Precipitate |
| Comparative Example 5 | Fe82.12Si7B4P6.5Cu0.38 | 75 | αFe + Com |
| Example 13 | Fe82.12Si5.8B5.2P6.5Cu0.38 | 8 | αFe |
| Example 14 | Fe82.12Si4B6P7.5Cu0.38 | 3 | αFe |
| Example 15 | Fe82.12Si2B6P9.5Cu0.38 | 0 | amo |
| Example 16 | Fe82.12Si0B7P10.5Cu0.38 | 0 | amo |

TABLE 4

| | Heat treatment condition | Fe-based nanocrystalline alloy powder | | Dust core | | |
|---|---|---|---|---|---|---|
| | Maximum end-point temperature Tmax (° C.) | Chemical composition | Saturation magnetic flux density Bs (T) | Fe crystallite diameter (nm) | Core loss (kW/m$^3$) | Core loss evaluation |
| Comparative Example 6 | 400 | Fe82.12Si7B4P6.5Cu0.38 | 1.75 | Compound phase | 3800 | Poor |
| Example 17 | 400 | Fe82.12Si5.8B5.2P6.5Cu0.38 | 1.76 | 39 | 192 | Good |
| Example 18 | 400 | Fe82.12Si4B6P7.5Cu0.38 | 1.75 | 36 | 98 | Excellent |
| Example 19 | 410 | Fe82.12Si2B6P9.5Cu0.38 | 1.71 | 34 | 80 | Excellent |
| Example 20 | 410 | Fe82.12Si0B7P10.5Cu0.38 | 1.70 | 30 | 75 | Excellent |

TABLE 5

| | Soft magnetic powder | | |
|---|---|---|---|
| | Chemical composition | Degree of crystallinity (%) | Precipitate |
| Comparative Example 7 | Fe82.12Sil.5B12P4Cu0.38 | 20 | αFe + Com |
| Example 21 | Fe82.12Si2B10P5.5Cu0.38 | 9 | αFe |
| Example 22 | Fe82.12Si3B9.5P5.0Cu0.38 | 10 | αFe |
| Example 23 | Fe82.12Si0B8.5P9Cu0.38 | 2 | αFe |
| Example 24 | Fe82.12Si3B7.5P7Cu0.38 | 2 | αFe |
| Example 25 | Fe83.12Si3B3P10.5Cu0.38 | 3 | αFe |
| Comparative Example 8 | Fe83.12Si5.5B0P11Cu0.38 | 50 | αFe |

TABLE 6

| | Heat treatment condition | Fe-based nanocrystalline alloy powder | | Dust core | | |
|---|---|---|---|---|---|---|
| | Maximum end-point temperature Tmax (° C.) | Chemical composition | Saturation magnetic flux density Bs (T) | Fe crystallite diameter (nm) | Core loss (kW/m³) | Core loss evaluation |
| Comparative Example 9 | 430 | Fe82.12Si1.5B12P4Cu0.38 | 1.77 | Compound phase | 1800 | Poor |
| Example 26 | 430 | Fe82.12Si2B10P5.5Cu0.38 | 1.75 | 48 | 195 | Good |
| Example 27 | 420 | Fe82.12Si3B9.5P5.0Cu0.38 | 1.76 | 45 | 188 | Good |
| Example 28 | 420 | Fe82.12Si0B8.5P9Cu0.38 | 1.72 | 35 | 90 | Excellent |
| Example 29 | 420 | Fe82.12Si3B7.5P7Cu0.38 | 1.74 | 40 | 80 | Excellent |
| Example 30 | 410 | Fe83.12Si3B3P10.5Cu0.38 | 1.73 | 38 | 130 | Good |
| Comparative Example 10 | 410 | Fe83.12Si5.5B0P11Cu0.38 | 1.64 | 65 | 3200 | Poor |

TABLE 7

| | Soft magnetic powder | | |
|---|---|---|---|
| | Chemical composition | Degree of crystallinity (%) | Precipitate |
| Comparative Example 11 | Fe82.12Si1.5B4P12Cu0.38 | 18 | αFe + Com |
| Example 31 | Fe82.12Si1B5.5P11Cu0.38 | 1 | αFe |
| Example 32 | Fe82.12Si0B6.8P10.7Cu0.38 | 2 | αFe |
| Example 33 | Fe82.12Si0B7.5P10Cu0.38 | 5 | αFe |
| Example 34 | Fe82.12Si2B5.5P10Cu0.38 | 3 | αFe |
| Example 35 | Fe82.12Si3B6.5P8Cu0.38 | 1 | αFe |
| Example 36 | Fe82.12Si4B7.5P6Cu0.38 | 2 | αFe |
| Example 37 | Fe82.12Si5B8.3P4.2Cu0.38 | 10 | αFe |
| Comparative Example 12 | Fe83.12Si5B8.5P3Cu0.38 | 11 | αFe |

TABLE 9

| | Soft magnetic powder | | |
|---|---|---|---|
| | Chemical composition | Degree of crystallinity (%) | Precipitate |
| Comparative Example 15 | Fe81.9Si4B7P6.5Cu0.6 | 15 | αFe |
| Example 45 | Fe81.97Si3B7P7.5Cu0.53 | 3 | αFe |
| Example 46 | Fe82.05Si4B7P6.5Cu0.45 | 2 | αFe |
| Example 47 | Fe82.11Si4B7P6.5Cu0.39 | 1 | αFe |
| Example 48 | Fe82.14Si4B7P6.5Cu0.36 | 2 | αFe |
| Example 49 | Fe82.2Si1B7P9.5Cu0.3 | 1 | αFe |
| Example 50 | Fe82.2Si0B7P10.5Cu0.3 | 2 | αFe |
| Example 51 | Fe82.3Si4B7P6.5Cu0.2 | 0 | amo |
| Comparative Example 16 | Fe82.4Si4B8P5.5Cu0.1 | 0 | amo |

TABLE 8

| | Heat treatment condition | Fe-based nanocrystalline alloy powder | | Dust core | | |
|---|---|---|---|---|---|---|
| | Maximum end-point temperature Tmax (° C.) | Chemical composition | Saturation magnetic flux density Bs (T) | Fe crystallite diameter (nm) | Core loss (kW/m³) | Core loss evaluation |
| Comparative Example 13 | 430 | Fe82.12Si1.5B4P12Cu0.38 | 1.62 | Compound phase | 800 | Poor |
| Example 38 | 430 | Fe82.12Si1B5.5P11Cu0.38 | 1.70 | 29 | 180 | Good |
| Example 39 | 420 | Fe82.12Si0B6.8P10.7Cu0.38 | 1.71 | 31 | 190 | Good |
| Example 40 | 420 | Fe82.12Si0B7.5P10Cu0.38 | 1.71 | 33 | 170 | Good |
| Example 41 | 420 | Fe82.12Si2B5.5P10Cu0.38 | 1.72 | 32 | 165 | Good |
| Example 42 | 410 | Fe82.12Si3B6.5P8Cu0.38 | 1.73 | 26 | 80 | Excellent |
| Example 43 | 410 | Fe82.12Si4B7.5P6Cu0.38 | 1.75 | 28 | 82 | Excellent |
| Example 44 | 410 | Fe82.12Si5B8.3P4.2Cu0.38 | 1.77 | 45 | 198 | Good |
| Comparative Example 14 | 410 | Fe83.12Si5B8.5P3Cu0.38 | 1.78 | 55 | 600 | Poor |

TABLE 10

| | Heat treatment condition | Fe-based nanocrystalline alloy powder | | Dust core | | |
|---|---|---|---|---|---|---|
| | Maximum end-point temperature Tmax (° C.) | Chemical composition | Saturation magnetic flux density Bs (T) | Fe crystallite diameter (nm) | Core loss (kW/m$^3$) | Core loss evaluation |
| Comparative Example 17 | 410 | Fe81.9Si4B7P6.5Cu0.6 | 1.73 | 38 | 1200 | Poor |
| Example 52 | 410 | Fe81.97Si3B7P7.5Cu0.53 | 1.75 | 39 | 200 | Good |
| Example 53 | 420 | Fe82.05Si4B7P6.5Cu0.45 | 1.73 | 36 | 190 | Good |
| Example 54 | 420 | Fe82.11Si4B7P6.5Cu0.39 | 1.74 | 25 | 50 | Excellent |
| Example 55 | 420 | Fe82.14Si4B7P6.5Cu0.36 | 1.72 | 30 | 80 | Excellent |
| Example 56 | 420 | Fe82.2Si1B7P9.5Cu0.3 | 1.71 | 31 | 130 | Good |
| Example 57 | 420 | Fe82.2Si0B7P10.5Cu0.3 | 1.71 | 32 | 130 | Good |
| Example 58 | 420 | Fe82.3Si4B7P6.5Cu0.2 | 1.65 | 33 | 190 | Good |
| Comparative Example 18 | 420 | Fe82.4Si3B8P5.5Cu0.1 | 1.62 | 54 | 420 | Poor |

TABLE 11

| | Soft magnetic powder | | |
|---|---|---|---|
| | Chemical composition | Degree of crystallinity (%) | Precipitate |
| Comparative Example 19 | Fe80.12Si2B6P6.5Cu0.38Nb5 | 24 | αFe + Com |
| Example 59 | Fe81.22Si3B7P4.5Cu0.38Nb3.9 | 3 | αFe |
| Example 60 | Fe81.02Si2B7P6.5Cu0.38Nb3.1 | 1 | αFe |
| Example 61 | Fe82.12Si2B8P5Cu0.38Nb2.5 | 0 | amo |
| Example 62 | Fe82.32Si0B7P8.5Cu0.38Nb1.8 | 0 | amo |
| Example 63 | Fe82.72Si2B7P6.7Cu0.38Nb1.2 | 0 | amo |
| Example 64 | Fe83.12Si4B6P5.7Cu0.38Nb0.8 | 2 | αFe |
| Example 65 | Fe83.19Si2B8.6P5.5Cu0.31Nb0.4 | 0 | amo |
| Example 66 | Fe83.13Si3B6.4P7Cu0.38Nb0.09 | 1 | αFe |
| Example 67 | Fe83.13Si1B7.4P8Cu0.38Nb0.09 | 0 | amo |
| Example 68 | Fe82Si2B8P6.1Cu0.3Mo1.6 | 1 | αFe |
| Example 69 | Fe82Si2B8P6.3Cu0.3Ta1.4 | 2 | αFe |
| Example 70 | Fe82Si2B8P5.9Cu0.3Zr1.8 | 3 | αFe |
| Example 71 | Fe82Si3B8P5.9Cu0.3Hf0.8 | 2 | αFe |
| Example 72 | Fe82.28Si0B8.4P9Cu0.3Ti0.02 | 3 | αFe |
| Example 73 | Fe82.3Si0B8P9Cu0.3Al0.4 | 1 | αFe |
| Example 74 | Fe82Si2B8P5.6Cu0.3Cr2.1 | 0 | amo |
| Example 75 | Fe82Si2B8P5.9Cu0.3Mn1.8 | 2 | αFe |
| Example 76 | Fe83Si2B7P6.6Cu0.3C1.1 | 0 | amo |
| Example 77 | Fe82.0Si0B8P9Cu0.3S0.7 | 0 | amo |
| Example 78 | Fe82.24Si2B7.4P8Cu0.3O0.06 | 3 | αFe |
| Example 79 | Fe82.29Si2B7.4P8Cu0.3N0.01 | 0 | amo |
| Example 80 | Fe82.92Si3B7P5.7Cu0.38Nb0.8Cr0.2 | 0 | amo |
| Comparative Example 20 | Fe80.12Si2B6P6.5Cu0.38Ti3Al2 | 80 | amo |

TABLE 12

| | Heat treatment condition | Fe-based nanocrystalline alloy powder | | Dust core | | |
|---|---|---|---|---|---|---|
| | Maximum end-point temperature Tmax (° C.) | Chemical composition | Saturation magnetic flux density Bs (T) | Fe crystallite diameter (nm) | Core loss (kW/m$^3$) | Core loss evaluation |
| Comparative Example 21 | 450 | Fe80.12Si2B6P6.5Cu0.38Nb5 | 1.48 | Compound phase | 1600 | Poor |
| Example 81 | 450 | Fe81.22Si3B7P4.5Cu0.38Nb3.9 | 1.65 | 24 | 180 | Good |
| Example 82 | 450 | Fe81.02Si2B7P6.5Cu0.38Nb3.1 | 1.67 | 31 | 120 | Good |
| Example 83 | 440 | Fe82.12Si2B8P5Cu0.38Nb2.5 | 1.73 | 29 | 90 | Excellent |
| Example 84 | 440 | Fe82.32Si0B7P8.5Cu0.38Nb1.8 | 1.71 | 26 | 80 | Excellent |

TABLE 12-continued

| | Heat treatment condition | Fe-based nanocrystalline alloy powder | | Dust core | | |
|---|---|---|---|---|---|---|
| | Maximum end-point temperature Tmax (° C.) | Chemical composition | Saturation magnetic flux density Bs (T) | Fe crystallite diameter (nm) | Core loss (kW/m³) | Core loss evaluation |
| Example 85 | 430 | Fe82.72Si2B7P6.7Cu0.38Nb1.2 | 1.74 | 32 | 90 | Excellent |
| Example 86 | 430 | Fe83.12Si4B6P5.7Cu0.38Nb0.8 | 1.74 | 31 | 70 | Excellent |
| Example 87 | 420 | Fe83.19Si2B8.6P5.5Cu0.31Nb0.4 | 1.73 | 33 | 120 | Good |
| Example 88 | 420 | Fe83.13Si3B6.4P7Cu0.38Nb0.09 | 1.76 | 29 | 90 | Excellent |
| Example 89 | 420 | Fe83.13Si1B7.4P8Cu0.38Nb0.09 | 1.72 | 24 | 70 | Excellent |
| Example 90 | 440 | Fe82Si2B8P6.1Cu0.3Mo1.6 | 1.71 | 28 | 90 | Excellent |
| Example 91 | 460 | Fe82Si2B8P6.3Cu0.3Ta1.4 | 1.7 | 31 | 90 | Excellent |
| Example 92 | 440 | Fe82Si2B8P5.9Cu0.3Zr1.8 | 1.72 | 34 | 160 | Good |
| Example 93 | 440 | Fe82Si3B8P5.9Cu0.3Hf0.8 | 1.73 | 28 | 120 | Good |
| Example 94 | 420 | Fe82.28Si0B8.4P9Cu0.3Ti0.02 | 1.74 | 35 | 190 | Good |
| Example 95 | 420 | Fe82.3Si0B8P9Cu0.3Al0.4 | 1.75 | 33 | 130 | Good |
| Example 96 | 420 | Fe82Si2B8P5.6Cu0.3Cr2.1 | 1.7 | 33 | 80 | Excellent |
| Example 97 | 420 | Fe82Si2B8P5.9Cu0.3Mn1.8 | 1.71 | 34 | 130 | Good |
| Example 98 | 420 | Fe83Si2B7P6.6Cu0.3C1.1 | 1.77 | 33 | 80 | Excellent |
| Example 99 | 420 | Fe82.0Si0B8P9Cu0.3S0.7 | 1.73 | 32 | 90 | Excellent |
| Example 100 | 420 | Fe82.24Si2B7.4P8Cu0.3O0.06 | 1.74 | 34 | 150 | Good |
| Example 101 | 420 | Fe82.29Si2B7.4P8Cu0.3N0.01 | 1.75 | 32 | 90 | Excellent |
| Example 102 | 430 | Fe82.92Si3B7P5.7Cu0.38Nb0.8Cr0.2 | 1.72 | 28 | 70 | Excellent |
| Comparative Example 22 | 430 | Fe80.12Si2B6P6.5Cu0.38Ti3Al2 | 1.76 | Compound phase | 3800 | Poor |

As used herein, the notation of "compound phase" in the "Fe crystallite diameter" column of the tables including Table 2 means that a compound phase such as an Fe—P or Fe—B compound was precipitated, rather than meaning the Fe nanocrystal intended in the present disclosure. When these compound phases are precipitated, the magnetic properties are significantly deteriorated. Therefore, the precipitation of these compound phases should be avoided. Because they are crystals different from the intended Fe nanocrystal, the Fe crystallite diameter is not indicated.

Seventh Example

To evaluate the influence of the median of the circularity of the soft magnetic powder on the apparent density and the magnetic properties, soft magnetic powders having the chemical compositions listed in Table 13 were produced. During the production of the soft magnetic powders, water atomization was performed under different conditions in which the speed of water to be collided with molten steel was changed to obtain soft magnetic powders having different median circularity values. The others were the same as that of the first example.

The particle size distribution of the obtained soft magnetic powder was measured with the same method as in the first example. As a result, all the soft magnetic powders had a particle size of 1 mm or less.

The median of the circularity of the obtained soft magnetic powder was measured with the method described above. In the measurement, the circularity of 60,000 particles randomly extracted from the particles constituting the soft magnetic powder was calculated by microscopic observation, and the median φ50 (dimensionless) of the obtained circularity was obtained. The obtained results are also listed in Table 13.

Further, the apparent density (g/cm$^3$) of the soft magnetic powder was measured with the method specified in JIS Z2504. The results are also listed in Table 13.

As can be seen from the results of Examples 103 to 112, the larger the φ50 is, that is, the closer the particles are to sphere, the higher the apparent density of the powder is. Specifically, a powder having a φ50 of 0.4 or more had an apparent density of 3.5 g/cm$^3$ or more.

Next, dust cores were produced using the soft magnetic powders (that had not been heat-treated) in the same manner as in the first example. In the heat treatment after compacting, the green compact was heated up to the maximum end-point temperature (Tmax) listed in Table 13 at a heating rate of 10° C./min and held at the maximum end-point temperature for 10 minutes. Subsequently, the density (compacted density) and the core loss of the obtained dust core were measured. The compacted density was obtained by dividing the mass of the green compact after compacting by the volume of the green compact after compacting. In addition, the core loss was measured with the same method as in the first example. The core loss evaluation criteria were the same as in the first example, too. The value of the obtained compacted density and the core loss are also listed in Table 13.

As indicated in Table 13, the core loss of the dust core decreased as the apparent density of the soft magnetic powder increased. This is because, when the apparent density increased, the compacted density of the dust core increased, and the voids in the dust core decreased.

The soft magnetic powders of Comparative Examples 24 and 26 and Examples 103 and 108 all have the same apparent density of 3.5 g/cm$^3$. However, the soft magnetic powders of Comparative Examples 24 and 26, in which the φ50 was less than 0.4, had a larger core loss than the soft magnetic powders of Examples 103 and 108, in which the φ50 was 4.0. The reason is considered as follows. The soft magnetic powder with a low circularity had a distorted particle shape, so that the stress concentrated on a convex portion during the green compacting. As a result, the insulating coating formed by, for example, oxidation on the surface of the soft magnetic powder was broken. Therefore, the φ50 of the soft magnetic powder should be 0.4 or more. In addition, by setting the φ50 to 0.7 or more, the core loss was further reduced. Therefore, the φ50 is preferably 0.7 or more.

TABLE 13

| | Soft magnetic powder | | | Heat treatment condition | Dust core | | |
|---|---|---|---|---|---|---|---|
| | | Median of circulariy | Apparent | Maximum end-point temperature | | | |
| | Chemical composition | φ50 (—) | density (g/cm$^3$) | Tmax (° C.) | Compressed density (g/cm$^3$) | Core loss (kW/m$^3$) | Core loss evaluation |
| Comparative Example 23 | Fe84Si3B5P7.7Cu0.3Nb0 | 0.30 | 2.8 | 430 | 4.00 | 1500 | Poor |
| Comparative Example 24 | | 0.39 | 3.5 | 430 | 4.45 | 1400 | Poor |
| Example 103 | | 0.40 | 3.5 | 430 | 4.45 | 180 | Good |
| Example 104 | | 0.70 | 4.0 | 430 | 4.90 | 98 | Excellent |
| Example 105 | | 0.80 | 4.1 | 430 | 5.20 | 96 | Excellent |
| Example 106 | | 0.90 | 4.2 | 430 | 5.40 | 94 | Excellent |
| Example 107 | | 1.00 | 4.3 | 430 | 5.45 | 88 | Excellent |
| Comparative Example 25 | Fe82Si4B6P6Cu0.3Nb1.7 | 0.30 | 2.7 | 410 | 3.95 | 1400 | Poor |
| Comparative Example 26 | | 0.39 | 3.5 | 410 | 4.90 | 1380 | Poor |
| Example 108 | | 0.40 | 3.5 | 410 | 4.90 | 175 | Good |
| Example 109 | | 0.70 | 4.1 | 410 | 5.35 | 95 | Excellent |
| Example 110 | | 0.80 | 4.2 | 410 | 5.30 | 93 | Excellent |
| Example 111 | | 0.90 | 4.3 | 410 | 5.40 | 91 | Excellent |
| Example 112 | | 1.00 | 4.4 | 410 | 5.60 | 87 | Excellent |

Eighth Example

To evaluate the influence of the equivalent number n of the soft magnetic powder on the apparent density and the magnetic properties, soft magnetic powders having the chemical compositions listed in Table 14 were produced. During the production of the soft magnetic powders, water atomization was performed under different conditions in which the speed of water to be collided with molten steel was changed. The others were the same as that of the seventh example.

The particle size distribution of the obtained soft magnetic powder was measured with the same method as in the first example. As a result, all the soft magnetic powders had a particle size of 1 mm or less.

The particle size distribution of the obtained soft magnetic powder was measured by a laser particle size distribution meter, and the equivalent number n in the Rosin-Rammler equation was calculated with the method described above. The equivalent number n is an index indicating the breadth of the particle size distribution. In addition, the median of the circularity of the obtained soft magnetic powder was measured with the same method as in the seventh example. The obtained results are also listed in Table 14.

Next, dust cores were produced in the same manner as in the seventh example. The density (compacted density) and the core loss of the obtained dust core were measured. In the heat treatment after compacting, the green compact was heated up to the maximum end-point temperature (Tmax) listed in Table 14 at a heating rate of 10° C./min and held at the maximum end-point temperature for 10 minutes. The value of the obtained compacted density and the core loss are also listed in Table 14.

The φ50 of the obtained soft magnetic powder was about 0.90 in Examples 113 to 117, which was almost constant. Similarly, the 950 in Examples 113 to 121 was about 0.95, which was almost constant.

As can be seen from the results of Examples 113 to 121, even if the φ50 is almost constant, the larger the equivalent number n is, that is, the more uniform the particle sizes are, the higher the apparent density of the soft magnetic powder is. Particularly when the equivalent number n was 0.3 or more, the apparent density was 3.5 g/cm$^3$ or more, and the core loss of the dust core was further reduced. This is because, when the apparent density increased, the compacted density after green compacting increased, and the voids in the dust core decreased.

From the comparison between Examples 113 and 118 and Examples 114 and 119, it is found that, in Examples 113 and 118 where the equivalent number n was less than 0.3, the apparent density of the soft magnetic powder was low, and the core loss of the dust core was high. Therefore, the n of the soft magnetic powder is preferably 0.3 or more. In addition, from the comparison between Examples 116 and 121 and Examples 117 and 122, it is found that, in Examples 117 and 122 where the equivalent number n was more than 30, the apparent density of the soft magnetic powder was low, and the core loss of the dust core was large. The reason is as follows. Because the sizes of the particles constituting the soft magnetic powder were excessively uniform, the number of fine particles entering the gap between coarse particles decreased. As a result, the voids in the powder increased.

TABLE 14

| | Soft magnetic powder | | | | Heat treatment condition | Dust core | | |
|---|---|---|---|---|---|---|---|---|
| | Chemical composition | Uniform number n (—) | Median of circularity φ50 (—) | Apparent density (g/cm³) | Maximum end-point temperature Tmax (° C.) | Compressed density (g/cm³) | Core loss (kW/m³) | Core loss evaluation |
| Example 113 | Fe81.7Si5B7P6Cu0.3Nb0 | 0.29 | 0.90 | 2.5 | 430 | 3.80 | 198 | Good |
| Example 114 | | 0.30 | 0.89 | 3.5 | 430 | 4.30 | 190 | Good |
| Example 115 | | 10.00 | 0.91 | 3.8 | 430 | 5.00 | 90 | Excellent |
| Example 116 | | 30.00 | 0.88 | 4.8 | 430 | 5.60 | 70 | Excellent |
| Example 117 | | 31.00 | 0.90 | 3.0 | 430 | 4.10 | 196 | Good |
| Example 118 | Fe79.9Si4B6P7Cu0.5Nb2.6 | 0.25 | 0.95 | 2.9 | 410 | 4.20 | 196 | Good |
| Example 119 | | 0.30 | 0.94 | 3.5 | 410 | 4.40 | 180 | Good |
| Example 120 | | 10.00 | 0.93 | 3.9 | 410 | 5.00 | 88 | Excellent |
| Example 121 | | 30.00 | 0.95 | 4.9 | 410 | 5.80 | 69 | Excellent |
| Example 122 | | 31.00 | 0.94 | 3.2 | 410 | 3.95 | 192 | Good |

Ninth Example

To evaluate the influence of the median of the circularity and the equivalent number n of the soft magnetic powder on the saturation magnetic flux density of the dust core, soft magnetic powders having the chemical compositions listed in Table 15 were produced. During the production of the soft magnetic powders, water atomization was performed under different conditions in which the speed of water to be collided with molten steel was changed. The others were the same as that of the seventh example.

The particle size distribution of the obtained soft magnetic powder was measured with the same method as in the first example. As a result, all the soft magnetic powders had a particle size of 1 mm or less.

The median of the circularity φ50 and the equivalent number n of the obtained soft magnetic powder were obtained with the same method as in the seventh example. The obtained results are also listed in Table 15.

Next, dust cores were produced in the same manner as in the seventh example using the obtained soft magnetic powder, and the density (compacted density) and the saturation magnetic flux density of the obtained dust core were measured. In the heat treatment after compacting, the green compact was heated up to the maximum end-point temperature (Tmax) listed in Table 15 at a heating rate of 10° C./min and held at the maximum end-point temperature for 10 minutes. The saturation magnetic flux density was measured by a DC magnetizing and measuring device under the condition of a magnetic field of 100 A/m. The value of the obtained compacted density and the saturation magnetic flux density are also listed in Table 15. Note that a saturation magnetic flux density value of 1.30 T or more was classified as "excellent", and a saturation magnetic flux density value of 1.20 T or more and less than 1.30 T was classified as "good".

From the comparison between Examples 123 and 124 and Example 125, it is found that a good saturation magnetic flux density can be obtained when the φ50 is 0.4 or more and the n is 0.3 or more. The reason is as follows. The circularity and the equivalent number are factors of the compacted density. When both factors are less than a certain value, the compacting is insufficient, resulting in a low compacted density. As a result, the saturation magnetic flux density is low. When the φ50 is 0.4 or more and the n is 0.3 or more as in Examples 125 to 129, the compacted density increases as the value of any of the φ50 and the n increase. As a result, it is found that a high saturation magnetic flux density of 1.3 T or more can be obtained even in a dust core.

On the other hand, from the comparison between Example 130 and Example 129, it was found that, when the n is a value larger than 30, the compacted density and the saturation magnetic flux density decrease. The reason is as follows. In Example 130, the particle sizes were excessively uniform, so that the number of fine particles entering the gap between coarse particles decreased. As a result, the voids in the powder increased. Therefore, the n is preferably 30 or less as in Example 129.

TABLE 15

| | Soft magnetic powder | | | Heat treatment condition | Dust core | | |
|---|---|---|---|---|---|---|---|
| | Chemical composition | Uniform number n (—) | Median of circularity φ50 (—) | Maximum end-point temperature Tmax (° C.) | Compressed density (g/cm³) | Saturation magnetic flux density Bs (T) | Saturation magnetic flux density evaluation |
| Example 123 | Fe81.9Si3.6B6P6Cu0.5Nb2 | 0.30 | 0.39 | 420 | 4.40 | 1.23 | Good |
| Example 124 | | 0.29 | 0.40 | 420 | 4.80 | 1.24 | Good |
| Example 125 | | 0.30 | 0.40 | 420 | 5.25 | 1.30 | Excellent |
| Example 126 | | 1.00 | 0.40 | 420 | 5.50 | 1.31 | Excellent |
| Example 127 | | 1.00 | 0.70 | 420 | 5.60 | 1.32 | Excellent |
| Example 128 | | 2.00 | 0.80 | 420 | 5.70 | 1.34 | Excellent |
| Example 129 | | 30.00 | 1.00 | 420 | 5.75 | 1.35 | Excellent |
| Example 130 | | 31.00 | 1.00 | 420 | 3.97 | 1.21 | Good |

Tenth Example

To evaluate the influence of the particle size and the degree of crystallinity of the soft magnetic powder on the core loss of the dust core, soft magnetic powders having the chemical compositions listed in Table 16 were produced. During the production of the soft magnetic powders, water atomization was performed under different conditions in which the speed of water to be collided with molten steel was changed. The others were the same as that of the seventh example.

The particle size distribution of the obtained soft magnetic powder was measured by a laser particle size distribution meter, and the volume ratio of particles having a particle size of more than 200 μm and the volume ratio of particles having a particle size of more than 1 mm in the soft magnetic powder were calculated. In addition, the degree of crystallinity of the soft magnetic powder was measured with the same method as in the first example. The measurement results are also listed in Table 16.

Next, dust cores were produced in the same manner as in the seventh example using the obtained soft magnetic powder, and the core loss of the obtained dust core was measured. In the heat treatment after compacting, the green compact was heated up to the maximum end-point temperature (Tmax) listed in Table 16 at a heating rate of 10° C./min and held at the maximum end-point temperature for 10 minutes. The obtained core loss value and evaluation are also listed in Table 17. Note that each column of Table 16 corresponds to each column of Table 17. For example, Example 140 in Table 17 used the soft magnetic powder of Example 131 in Table 16.

In addition, the coercive force He (A/m), the saturation magnetic flux density Bs (T), and the Fe crystallite diameter (nm) of the Fe-based nanocrystalline alloy powder were measured. The coercive force He was measured using a vibrating sample magnetometer (VSM). The saturation magnetic flux density Bs and the Fe crystallite diameter were measured with the same method as in the first example.

It can be seen from Examples 30 to 32 and Examples 140 to 148 of Table 17 that, when particles of more than 1 mm are included, the degree of crystallinity of the soft magnetic powder is 10% or more, the Fe crystallite diameter increases, and the coercive force and the core loss are large. In addition, it can be seen from Examples 140 to 148 that, in the case of including no particles of more than 200 μm, the degree of crystallinity is 3% or less, the Fe crystallite diameter decreases, and the coercive force and the core loss are small. Therefore, the particle size of the soft magnetic powder should be 1 mm or less and is preferably 200 μm or less.

TABLE 16

| | Soft magnetic powder | | | | Heat treatment condition |
|---|---|---|---|---|---|
| | Chemical composition | Proportion of particles having a particle size of more than 200 μm (%) | Proportion of particles having a particle size of more than 1 mm (%) | Degree of crystallinity (%) | Maximum end-point temperature Tmax (° C.) |
| Comparative Example 27 | Fe81.65Si5B7P6Cu0.35Nb0 | 40 | 4 | 95 | 430 |
| Example 131 | | 40 | 0 | 10 | 430 |
| Example 132 | | 15 | 0 | 8 | 430 |
| Example 133 | | 0 | 0 | 3 | 430 |
| Comparative Example 28 | Fe79Si5B5P10Cu0.3Nb0.7 | 30 | 3 | 90 | 420 |
| Example 134 | | 30 | 0 | 10 | 420 |
| Example 135 | | 10 | 0 | 5 | 420 |
| Example 136 | | 0 | 0 | 1 | 420 |
| Comparative Example 29 | Fe84.5Si4B4P6Cu0.35Nb1.15 | 20 | 2 | 88 | 415 |
| Example 137 | | 20 | 0 | 8 | 415 |
| Example 138 | | 8 | 0 | 4 | 415 |
| Example 139 | | 0 | 0 | 0 | 415 |

TABLE 17

| | | Fe-based nanocrystalline alloy powder | | | Dust core | |
|---|---|---|---|---|---|---|
| | Chemical composition | Coercive force HC (A/m) | Saturation magnetic flux density Bs (T) | Fe crystallite diameter (nm) | Core loss (kW/m$^3$) | Core loss evaluation |
| Comparative Example 30 | Fe81.65Si5B7P6Cu0.35Nb0 | 5000 | 1.71 | 100 | 3000 | Poor |
| Example 140 | | 200 | 1.70 | 48 | 200 | Good |
| Example 141 | | 80 | 1.70 | 42 | 180 | Good |
| Example 142 | | 30 | 1.71 | 30 | 150 | Good |
| Comparative Example 31 | Fe79Si5B5P10Cu0.3Nb0.7 | 4000 | 1.62 | 90 | 2800 | Poor |

TABLE 17-continued

| | Chemical composition | Coercive force HC (A/m) | Saturation magnetic flux density Bs (T) | Fe crystallite diameter (nm) | Dust core: Core loss (kW/m$^3$) | Dust core: Core loss evaluation |
|---|---|---|---|---|---|---|
| Example 143 | | 170 | 1.65 | 45 | 180 | Good |
| Example 144 | | 65 | 1.65 | 38 | 150 | Good |
| Example 145 | | 25 | 1.66 | 20 | 130 | Good |
| Comparative Example 32 | Fe84.5Si4B4P6Cu0.35Nb1.15 | 4800 | 1.79 | 92 | 2850 | Poor |
| Example 146 | | 180 | 1.80 | 46 | 185 | Good |
| Example 147 | | 75 | 1.80 | 41 | 160 | Good |
| Example 148 | | 30 | 1.80 | 27 | 140 | Good |

(Columns 2–5 are under the spanning header "Fe-based nanocrystalline alloy powder".)

Tenth Example

Next, to evaluate the influence of the heating rate when heating the soft magnetic powder, soft magnetic powders having the chemical compositions listed in Table 18 were produced. The soft magnetic powders were produced in the same manner as in the seventh example.

The first crystallization temperature Tx1 and the second crystallization temperature Tx2 of the obtained soft magnetic powder were measured using a differential scanning calorimetry (DSC) device. The heating rate during the measurement was as listed in Table 18.

It can be seen from Reference Examples 1 to 18 that both Tx1 and Tx2 increase as the heating rate increases, yet the temperature difference ΔT between Tx1 and Tx2 decreases because Tx1 increases sharply. In Comparative Examples 40 to 42, since the heating rate is higher than 30° C./min, the ΔT is smaller than 60° C. In addition, since the peaks of the first crystallization and the second crystallization overlap, it is difficult to suppress the formation of compounds of Fe and B or Fe and P, which adversely affects the magnetic properties, by controlling the heat treatment temperature. Therefore, in the case of producing an Fe-based nanocrystalline alloy powder with the soft magnetic powder, it is necessary to perform the heat treatment at a heating rate of 30° C./min or lower. Further, from the viewpoint of dispersing heat generated by crystallization during the heat treatment, which is unique to nanocrystalline materials, it is preferable to raise the temperature slowly so that the whole magnetic core can be uniformly heat-treated.

TABLE 18

| | Chemical composition | Heating rate (° C./min) | T × 1 (° C.) | T × 2 (° C.) | ΔT (° C.) | Overlapping of peaks of first crystallization and second crystallization |
|---|---|---|---|---|---|---|
| Reference Example 1 | Fe81.65Si2B8P8Cu0.35Nb0 | 0.1 | 400 | 480 | 80 | No |
| Reference Example 2 | | 0.5 | 402 | 481 | 79 | |
| Reference Example 3 | | 3 | 405 | 483 | 78 | |
| Reference Example 4 | | 10 | 422 | 495 | 73 | |
| Reference Example 5 | | 30 | 443 | 504 | 61 | |
| Reference Example 6 | | 35 | 452 | 508 | 56 | Yes |
| Reference Example 7 | Fe79Si3B7P10Cu0.3Nb0.7 | 0.1 | 387 | 467 | 80 | No |
| Reference Example 8 | | 0.5 | 392 | 472 | 80 | |
| Reference Example 9 | | 3 | 396 | 475 | 79 | |
| Reference Example 10 | | 10 | 408 | 480 | 72 | |
| Reference Example 11 | | 30 | 432 | 494 | 62 | |
| Reference Example 12 | | 35 | 448 | 503 | 55 | Yes |
| Reference Example 13 | Fe84.5Si1B6P7Cu0.35Nb1.15 | 0.1 | 395 | 476 | 81 | No |
| Reference Example 14 | | 0.5 | 399 | 478 | 79 | |
| Reference Example 15 | | 3 | 404 | 482 | 78 | |
| Reference Example 16 | | 10 | 415 | 489 | 74 | |
| Reference Example 17 | | 30 | 445 | 506 | 61 | |
| Reference Example 18 | | 35 | 459 | 511 | 52 | Yes |

(Columns 2–7 are under the spanning header "Soft magnetic powder".)

Eleventh Example

Next, to evaluate the influence of the degree of crystallinity and the minor axis of an ellipse contained in the amorphous phase, soft magnetic powders having the chemical compositions listed in Table 19 were produced. The soft magnetic powders were produced in the same manner as in the seventh example.

The particle size distribution of the obtained soft magnetic powder was measured with the same method as in the first example. As a result, all the soft magnetic powders had a particle size of 1 mm or less. The median of the circularity of all the obtained soft magnetic powders was 0.7 or more and 1.0 or less.

Subsequently, the obtained soft magnetic powder was subjected to heat treatment to obtain an Fe-based nanocrystalline magnetic powder. In the heat treatment, the soft magnetic powder was heated up to the maximum end-point temperature (Tmax) listed in Table 19 at a heating rate of 10° C./min and held at the maximum end-point temperature for 10 minutes.

A 700 nm×700 nm portion of the obtained Fe-based nanocrystalline alloy powder was observed using a transmission electron microscope (TEM). The amorphous phase and the crystalline phase were distinguishable, and the maximum value of the minor axis of an ellipse included in the amorphous phase was calculated from the observed image. In addition, the degree of crystallinity (%) of the Fe-based nanocrystalline alloy powder was measured by X-ray diffraction (XRD). The measurement results are also listed in Table 19.

As can be seen from the results of Examples 149 to 156, when the degree of crystallinity is 30% or more by volume, the core loss can be further reduced. In addition, when the maximum value of the minor axis of an ellipse in the amorphous phase is 60 nm or less, the core loss can be further reduced because the distance between crystal grains is small. The minor axis of the ellipse is as illustrated in FIG. 1. Further, the crystallite diameters of Fe in the present example were all 50 nm or less.

The invention claimed is:

1. An Fe-based nanocrystalline alloy powder comprising a chemical composition, excluding inevitable impurities, represented by a composition formula of $Fe_aSi_bB_cP_dCu_eM_f$, wherein the M in the composition formula is at least one element selected from the group consisting of Nb, Mo, Zr, Ta, W, Hf, Ti, V, Cr, Mn, C, Al, S, O, and N, 79 at %≤a≤84.5 at %, 0 at %≤b<6 at %, 0 at %<c≤10 at %, 4 at %<d≤11 at %, 0.2 at %≤e≤0.53 at %, 0 at %≤f≤4 at %, a+b+c+d+e+f=100 at %, and a degree of crystallinity is more than 10% by volume, an Fe crystallite diameter of the Fe-based nanocrystalline alloy powder is 50 nm or less, and an equivalent number n in the Rosin-Rammler equation is 0.30 or more and 30 or less.

2. The Fe-based nanocrystalline alloy powder according to claim 1, wherein 0.2 at %≤e<0.4 at %.

3. The Fe-based nanocrystalline alloy powder according to claim 1, wherein 2 at %≤b<6 at %.

4. The Fe-based nanocrystalline alloy powder according to claim 1, wherein 0.3 at %≤e≤0.53 at %.

5. The Fe-based nanocrystalline alloy powder according to claim 4, wherein 0.35 at %≤e≤0.53 at %.

6. The Fe-based nanocrystalline alloy powder according to claim 1, wherein the degree of crystallinity is more than 30% by volume, and a maximum value of minor axis of an ellipse included in an amorphous phase in an area of 700 nm×700 nm in a cross section is 60 nm or less.

7. A magnetic component comprising the Fe-based nanocrystalline alloy powder according to claim 6.

8. A dust core comprising the Fe-based nanocrystalline alloy powder according to claim 6.

9. A magnetic component comprising the Fe-based nanocrystalline alloy powder according to claim 1.

TABLE 19

| | Soft magnetic powder Chemical composition | Heat treatment condition Maximum end-point temperature Tmax (° C.) | Fe-based nanocrystalline alloy powder: Precipitate | Fe-based nanocrystalline alloy powder: Degree of crystallinity (%) | Fe-based nanocrystalline alloy powder: Maximum value of minor axis of ellipse* (nm) | Dust core: Core loss of dust core ($kW/m^3$) | Dust core: Core loss evaluation |
|---|---|---|---|---|---|---|---|
| Example 149 | Fe82Si3B8P6.65Cu0.35Nb0 | 430 | αFe | 29 | 70 | 190 | Good |
| Example 150 | | 430 | | 31 | 59 | 95 | Excellent |
| Example 151 | | 430 | | 38 | 37 | 90 | Excellent |
| Example 152 | | 430 | | 42 | 31 | 80 | Excellent |
| Example 153 | Fe82Si3B8P6Cu0.35Nb0.65 | 420 | | 29 | 66 | 195 | Good |
| Example 154 | | 420 | | 31 | 60 | 98 | Excellent |
| Example 155 | | 420 | | 44 | 32 | 92 | Excellent |
| Example 156 | | 420 | | 45 | 28 | 60 | Excellent |

*Maximum value of the minor axis of an ellipse included in the amorphous phase in an area of 700 nm × 700 nm in a cross section

10. A dust core comprising the Fe-based nanocrystalline alloy powder according to claim 1.

* * * * *